(12) United States Patent
Egan et al.

(10) Patent No.: US 8,910,432 B2
(45) Date of Patent: Dec. 16, 2014

(54) TOWER STRUCTURE

(75) Inventors: Fallon M. Egan, Katy, TX (US);
Claudio J. Gutierrez, The Woodlands, TX (US); Christoval Sanchez, Katy, TX (US); Patrick M. Weisbrod, St. Louis, MO (US)

(73) Assignee: Electro Mechanical Industries, Inc., Houston, TX (US)

( * ) Notice: Subject to any disclaimer, the term of this patent is extended or adjusted under 35 U.S.C. 154(b) by 708 days.

(21) Appl. No.: 13/083,026

(22) Filed: Apr. 8, 2011

(65) Prior Publication Data
US 2011/0271608 A1    Nov. 10, 2011

Related U.S. Application Data

(60) Provisional application No. 61/322,706, filed on Apr. 9, 2010.

(51) Int. Cl.
| | |
|---|---|
| *E04H 12/34* | (2006.01) |
| *E04H 12/10* | (2006.01) |
| *E04H 12/18* | (2006.01) |
| *F24J 2/52* | (2006.01) |
| *F24J 2/54* | (2006.01) |
| *H01Q 1/08* | (2006.01) |
| *H01Q 1/12* | (2006.01) |

(52) U.S. Cl.
CPC .............. *E04H 12/10* (2013.01); *E04H 12/187* (2013.01); *F24J 2/523* (2013.01); *F24J 2/5406* (2013.01); *H01Q 1/08* (2013.01); *H01Q 1/1242* (2013.01); *F24J 2/5232* (2013.01); *Y02E 10/728* (2013.01); *Y02E 10/47* (2013.01)
USPC ................ 52/117; 52/120; 52/121; 52/126.1; 52/173.3; 212/299; 248/121; 343/882

(58) Field of Classification Search
USPC .................. 52/40, 116, 117, 120, 121, 126.1, 52/173.3, 169.13, 296; 343/757, 881, 882, 343/874, 875, 765; 212/294, 295, 299; 254/334, 338; 248/507, 121, 122.1, 248/125.1, 125.2; 174/45 R
See application file for complete search history.

(56) References Cited

U.S. PATENT DOCUMENTS 375,378 A * 12/1887 Perry ................................ 52/40
1,247,195 A * 11/1917 Willett ........................... 211/78

(Continued)

FOREIGN PATENT DOCUMENTS

| CA | 2386061 | * | 4/2001 |
| CA | 2418021 A1 | * | 8/2004 |

(Continued)

OTHER PUBLICATIONS

Machine translation of FR 2825516 (translated via the European Patent Office website; translated on Feb. 19, 2014).*

(Continued)

*Primary Examiner* — Robert Canfield
*Assistant Examiner* — Charissa Ahmad
(74) *Attorney, Agent, or Firm* — Patterson & Sheridan LLP

(57) ABSTRACT

Embodiments of the invention generally relate a method and apparatus for a tower structure. In one embodiment, the tower structure comprises a first base plate comprising a first hinge device, a first structural section having a first side and a second side, the first structural section coupled to a second base plate comprising a second hinge device, a second structural section coupled to the first structural section, and an aerial component coupled to the second structural section, wherein the first structural section is rotatable relative to the first base plate in a first rotational axis, the second structural section is rotatable relative to the first structural section in a second rotational axis, and at least a portion of the second structural section is received in a channel formed in the first side of the first structural section when the first structural section and the second structural section are substantially parallel.

11 Claims, 23 Drawing Sheets

(56) References Cited

U.S. PATENT DOCUMENTS

| | | | |
|---|---|---|---|
| 1,373,979 A * | 4/1921 | Ryals | 52/296 |
| 1,714,698 A * | 5/1929 | Stoll | 403/100 |
| 1,742,481 A * | 1/1930 | Miller | 116/173 |
| 2,199,897 A * | 5/1940 | Stringer | 52/152 |
| 2,213,870 A | 9/1940 | Scholl | |
| 2,364,851 A * | 12/1944 | Johansen | 52/119 |
| 2,582,050 A * | 1/1952 | Manson | 403/385 |
| 2,804,950 A * | 9/1957 | Leslie, Jr. | 52/117 |
| 2,822,066 A | 2/1958 | Hanson | |
| 2,985,261 A * | 5/1961 | Kubesh | 52/120 |
| 3,311,333 A * | 3/1967 | Galloway | 52/295 |
| 3,364,635 A * | 1/1968 | Guggemos | 52/28 |
| 3,450,378 A * | 6/1969 | Cucka | 248/514 |
| 3,671,738 A * | 6/1972 | Beachley | 362/431 |
| 3,977,139 A | 8/1976 | Bryant | |
| 4,079,559 A | 3/1978 | Tenbrummeler | |
| 4,149,347 A * | 4/1979 | Boemer | 52/116 |
| 4,167,740 A * | 9/1979 | Shriver | 343/882 |
| 4,217,738 A * | 8/1980 | Smith | 52/40 |
| 4,473,975 A * | 10/1984 | Golay | 52/29 |
| 4,590,719 A | 5/1986 | McKibbin | |
| 4,697,779 A * | 10/1987 | Guislain | 248/530 |
| 4,878,160 A * | 10/1989 | Reneau et al. | 362/269 |
| 4,903,442 A * | 2/1990 | Trommen | 52/116 |
| 5,103,236 A * | 4/1992 | DuShane | 343/765 |
| 5,611,177 A * | 3/1997 | Herbstritt | 52/111 |
| 5,782,042 A | 7/1998 | Klein | |
| 6,082,301 A * | 7/2000 | Kramer | 119/61.53 |
| 6,216,414 B1 | 4/2001 | Feldberg | |
| 6,249,261 B1 * | 6/2001 | Solberg et al. | 343/801 |
| 6,361,007 B1 | 3/2002 | Oby et al. | |
| 6,414,237 B1 * | 7/2002 | Boer | 136/251 |
| 6,470,645 B1 * | 10/2002 | Maliszewski et al. | 52/745.18 |
| 6,535,177 B1 * | 3/2003 | Dhellemmes et al. | 343/882 |
| 6,713,891 B2 * | 3/2004 | Kirkegaard et al. | 290/44 |
| 6,782,667 B2 * | 8/2004 | Henderson | 52/116 |
| 7,015,872 B1 | 3/2006 | Little | |
| 7,061,438 B2 * | 6/2006 | Aquino | 343/713 |
| 7,062,883 B1 | 6/2006 | Langholz et al. | |
| 7,089,705 B1 * | 8/2006 | Lieberman | 52/146 |
| 7,113,144 B2 * | 9/2006 | Lin et al. | 343/880 |
| 7,268,743 B2 * | 9/2007 | Lin | 343/880 |
| 7,462,117 B2 * | 12/2008 | White et al. | 473/481 |
| 8,037,646 B2 * | 10/2011 | Wobben | 52/126.3 |
| 8,130,168 B1 | 3/2012 | Sergi et al. | |
| 8,230,660 B2 * | 7/2012 | Muhlhauser | 52/745.17 |
| 8,505,867 B2 * | 8/2013 | Conrad | 248/431 |
| 8,568,055 B2 * | 10/2013 | Marques Lito Velez Grilo | 403/98 |
| 8,598,724 B2 * | 12/2013 | Ulanovskiy | 290/44 |
| 2002/0095878 A1 * | 7/2002 | Henderson | 52/116 |
| 2002/0149536 A1 * | 10/2002 | Safakhah | 343/882 |
| 2003/0175070 A1 * | 9/2003 | Booysen et al. | 403/231 |
| 2007/0175134 A1 * | 8/2007 | Christenson | 52/292 |
| 2010/0149059 A1 * | 6/2010 | Patel | 343/765 |
| 2010/0229473 A1 * | 9/2010 | Simpson et al. | 52/111 |
| 2011/0271608 A1 * | 11/2011 | Egan et al. | 52/122.1 |
| 2014/0115977 A1 * | 5/2014 | Egan et al. | 52/116 |

FOREIGN PATENT DOCUMENTS

| | | | | |
|---|---|---|---|---|
| DE | 2646353 | * | 4/1978 | |
| DE | 2806081 | * | 8/1979 | |
| DE | 3441573 A1 * | | 5/1986 | B66C 23/68 |
| DE | 4311512 C2 * | | 7/1996 | |
| DE | 29813088 U1 * | | 12/1998 | |
| DE | 19931713 A1 * | | 1/2001 | G01P 5/02 |
| DE | 102006024578 A1 * | | 8/2007 | E04H 12/18 |
| EP | 0026634 | * | 3/1984 | |
| FR | 2825516 A1 * | | 12/2002 | H01Q 1/08 |
| FR | 2861141 A1 * | | 4/2005 | |
| FR | 2912451 | * | 8/2008 | |
| FR | 2916785 A1 * | | 12/2008 | E04H 12/34 |
| GB | 2239463 A | * | 7/1991 | E04H 12/18 |
| WO | WO 2007141414 A1 * | | 12/2007 | E04H 12/18 |

OTHER PUBLICATIONS

Machine translation of DE 2646353 (translated via the European Patent Office website; translated on Feb. 21, 2014).*

Office Action Canada Patent Application 2,736,718 dated Feb. 8, 2013.

* cited by examiner

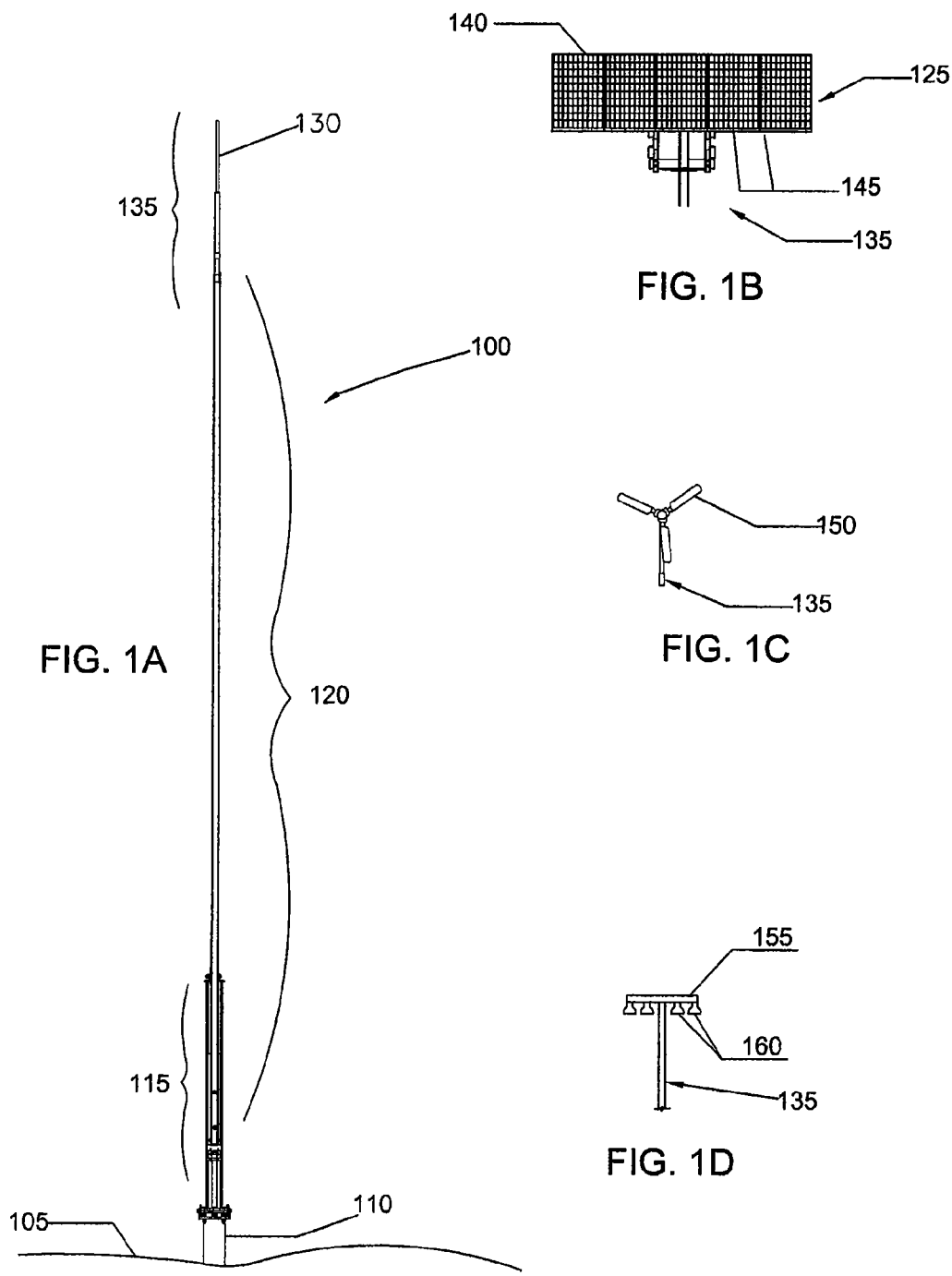

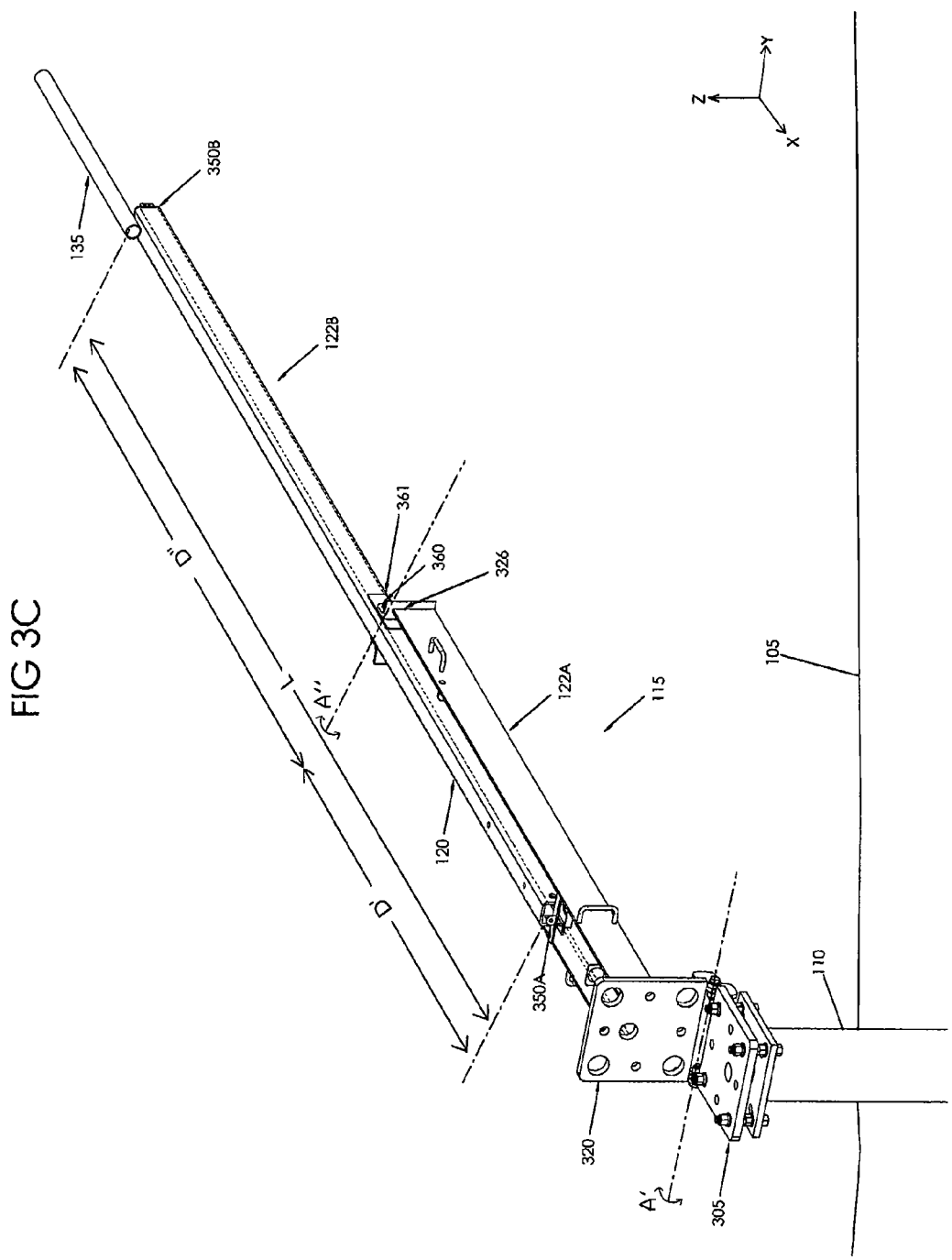

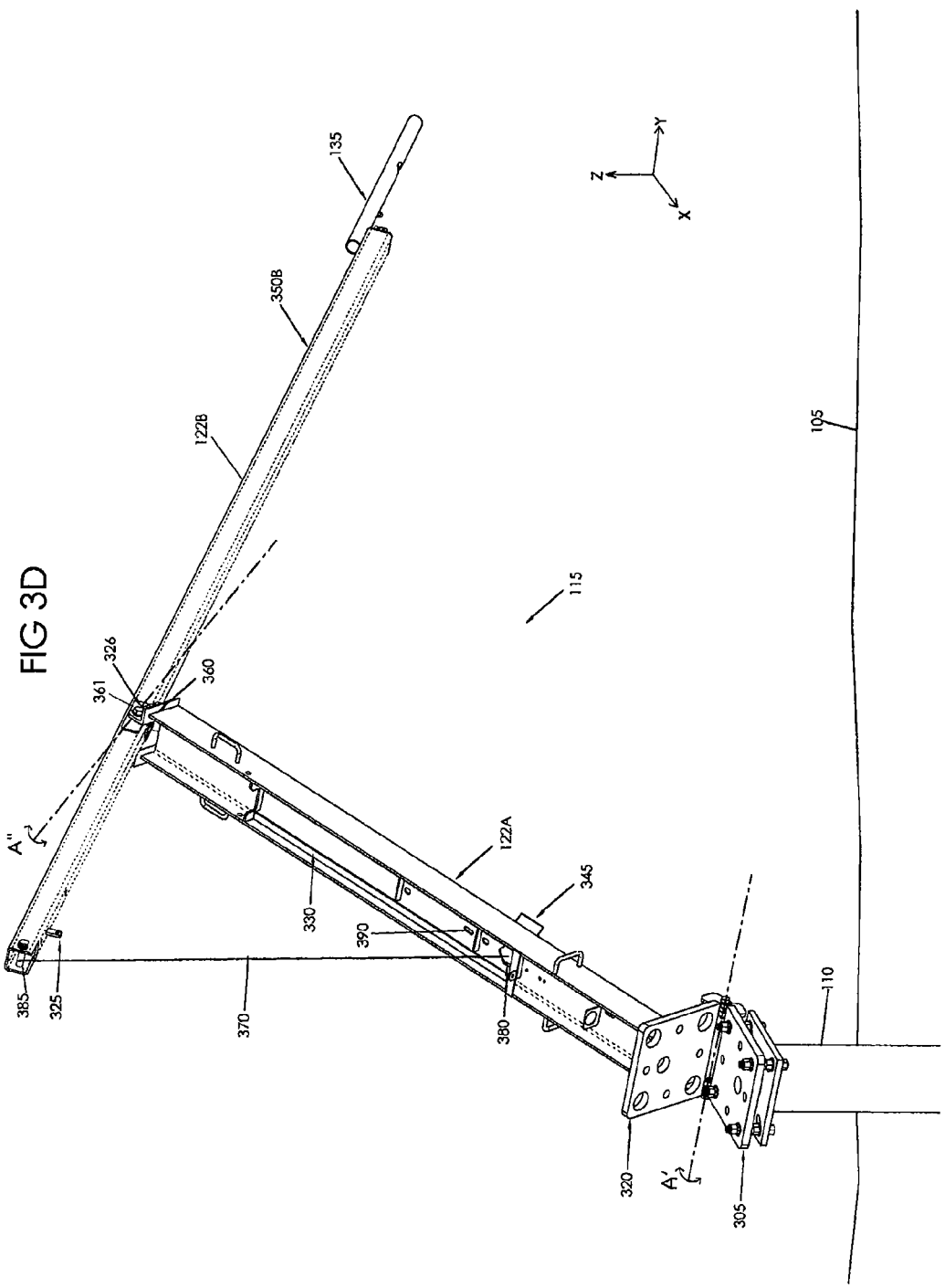

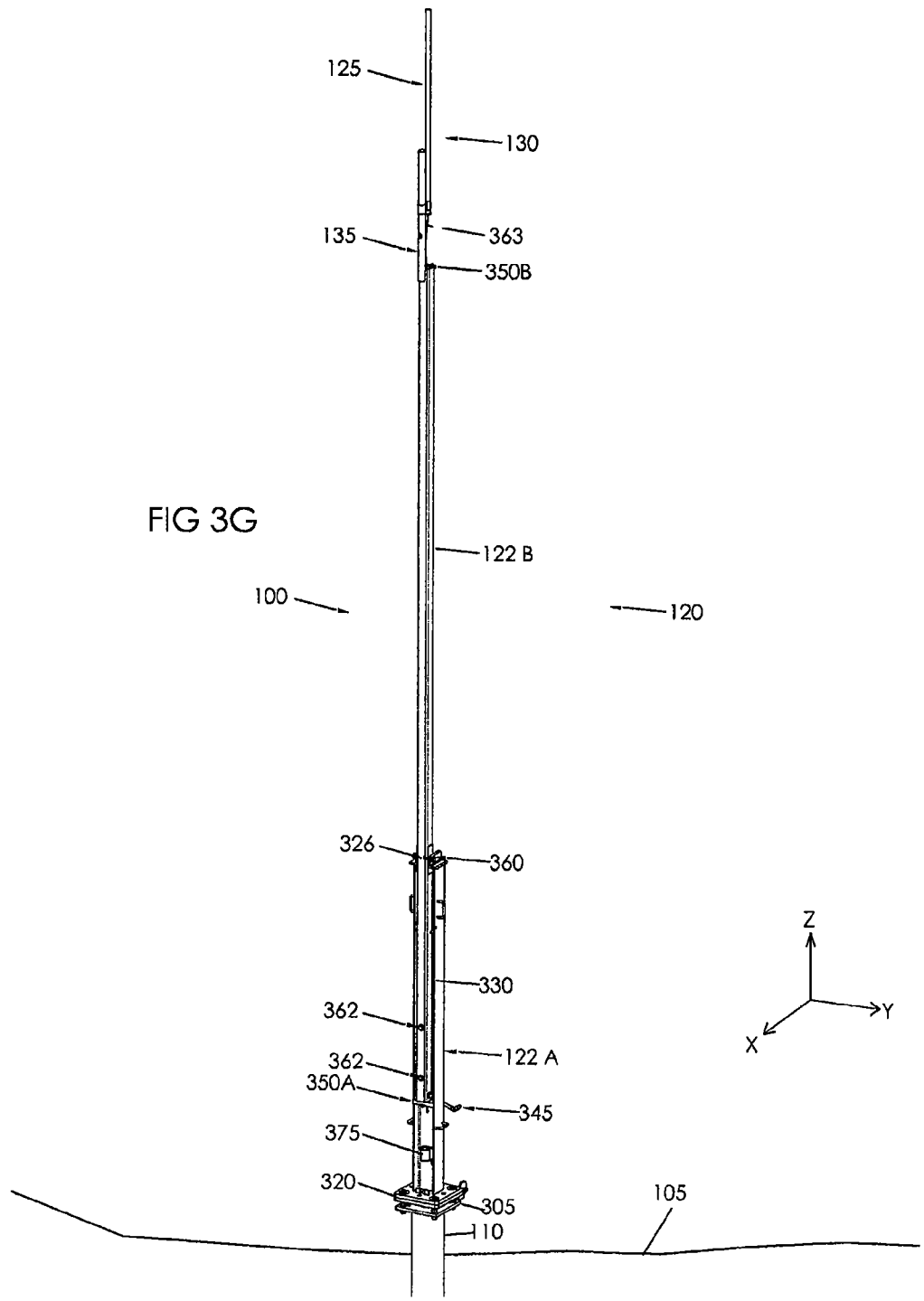

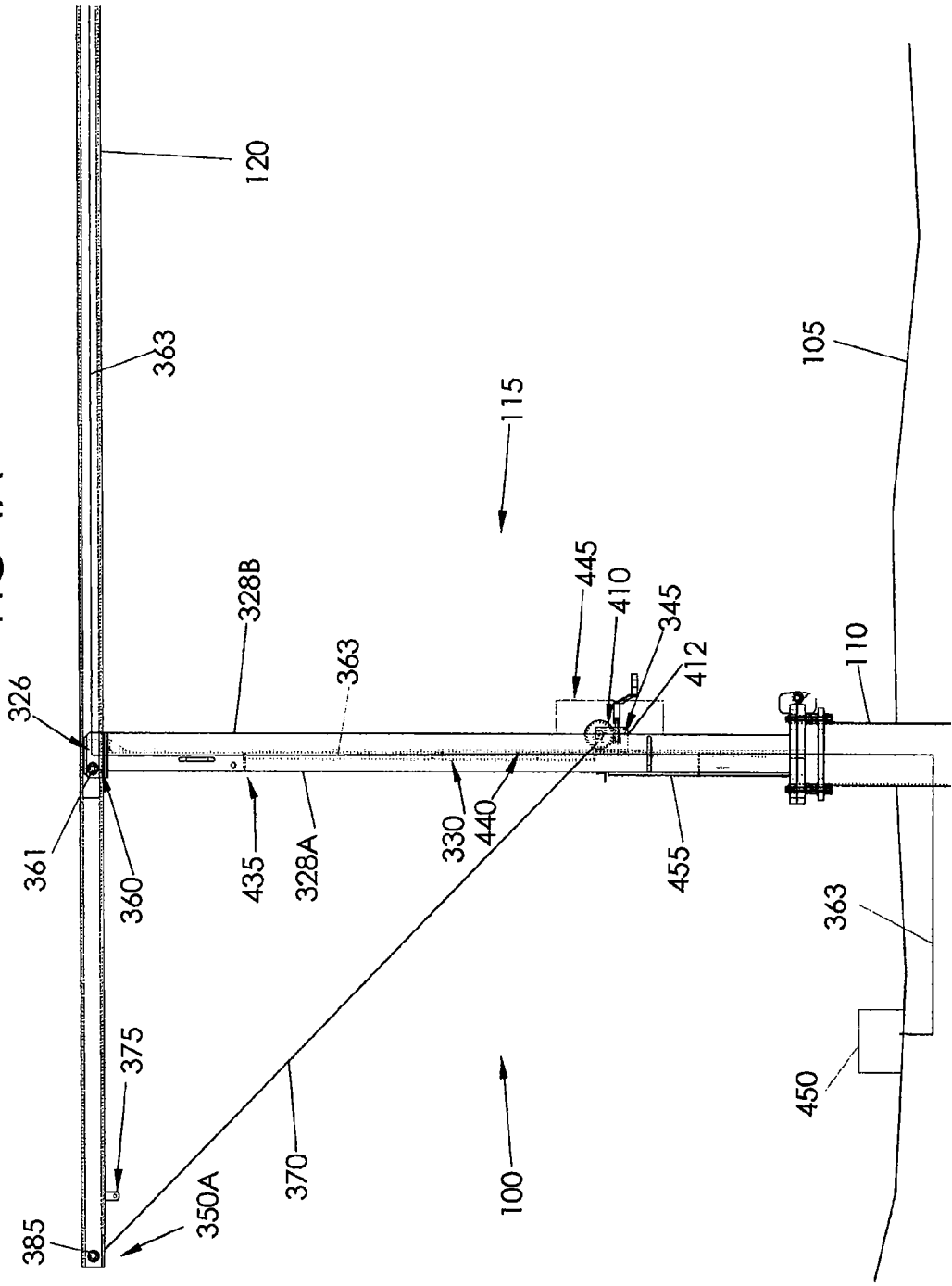

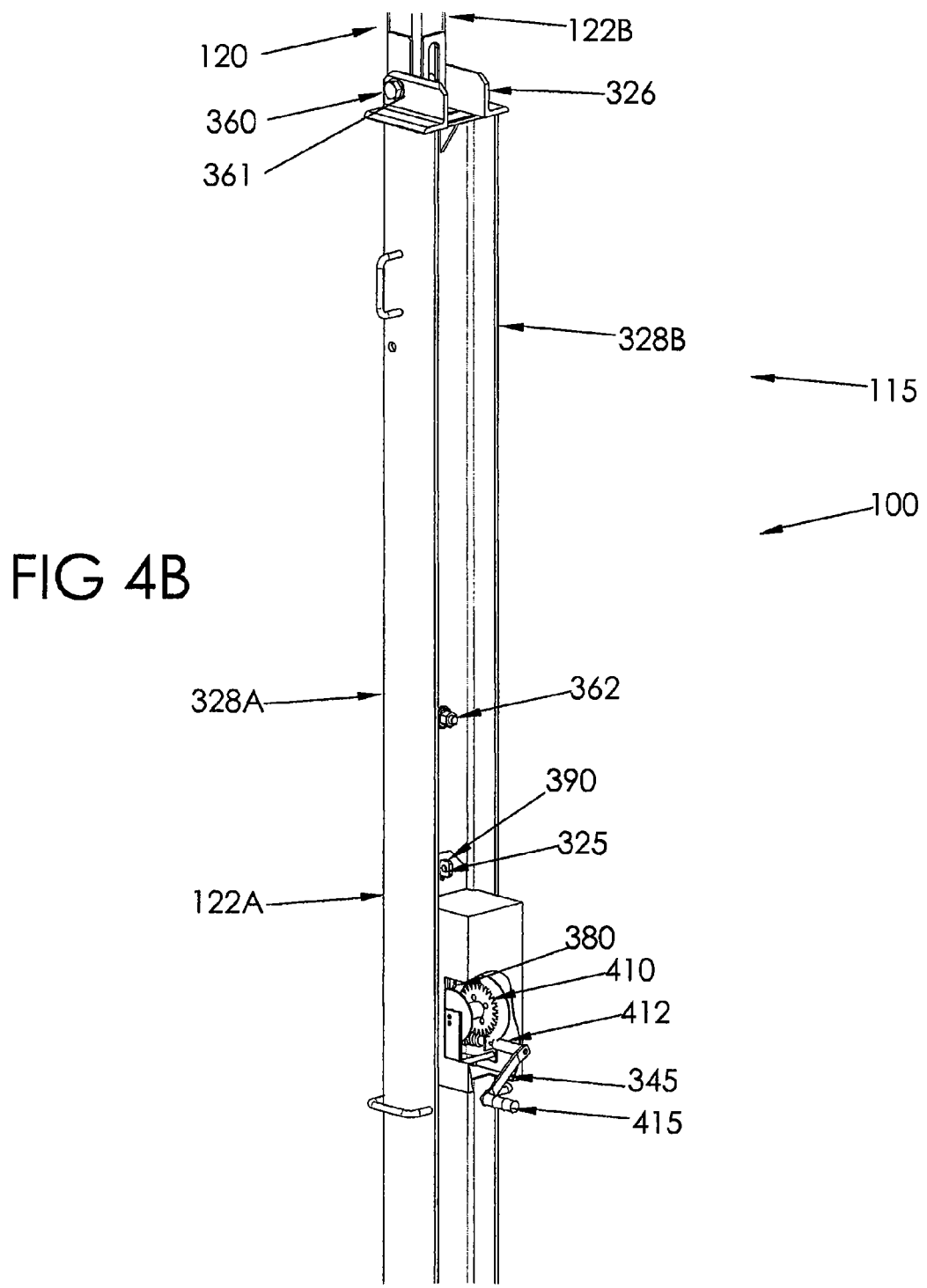

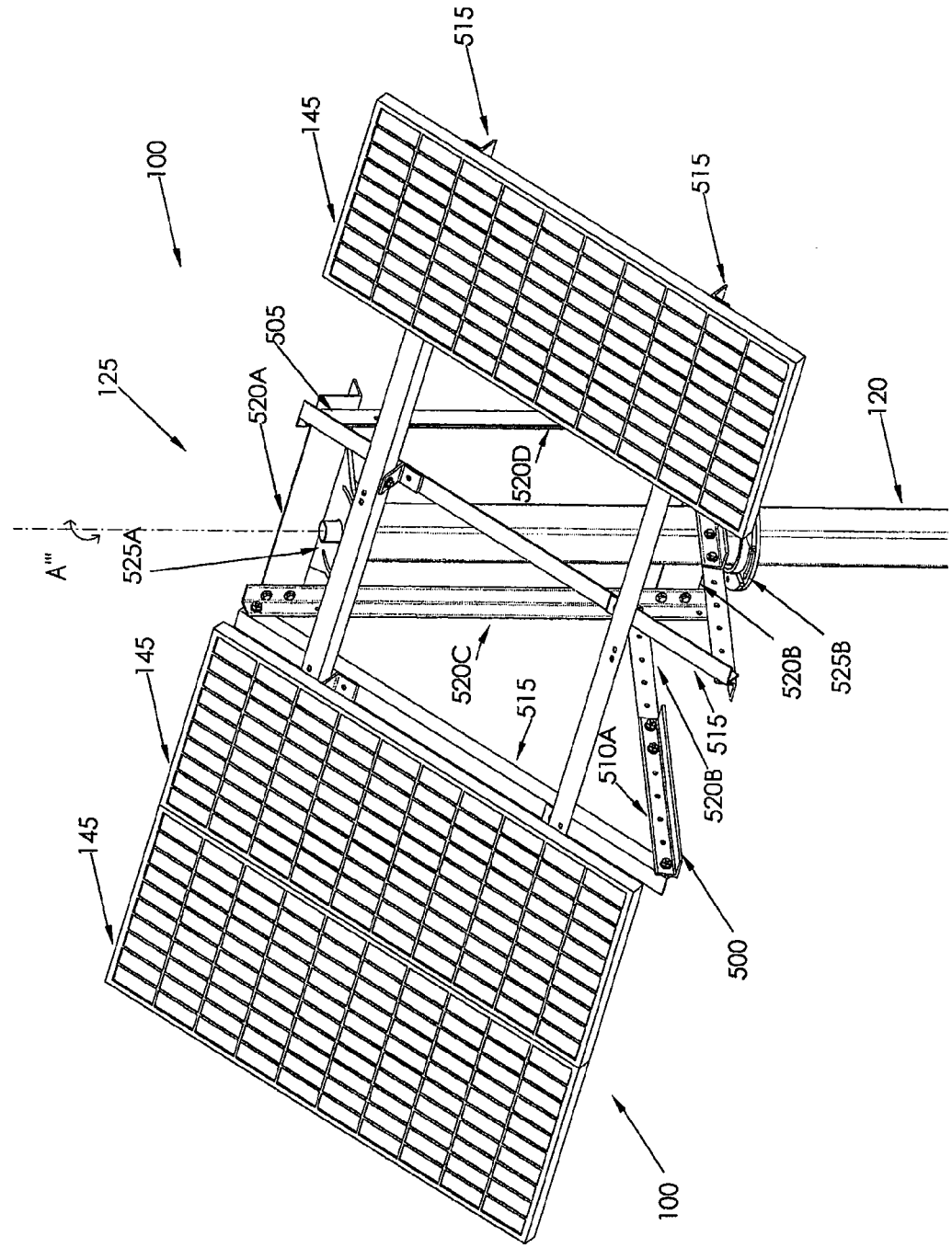

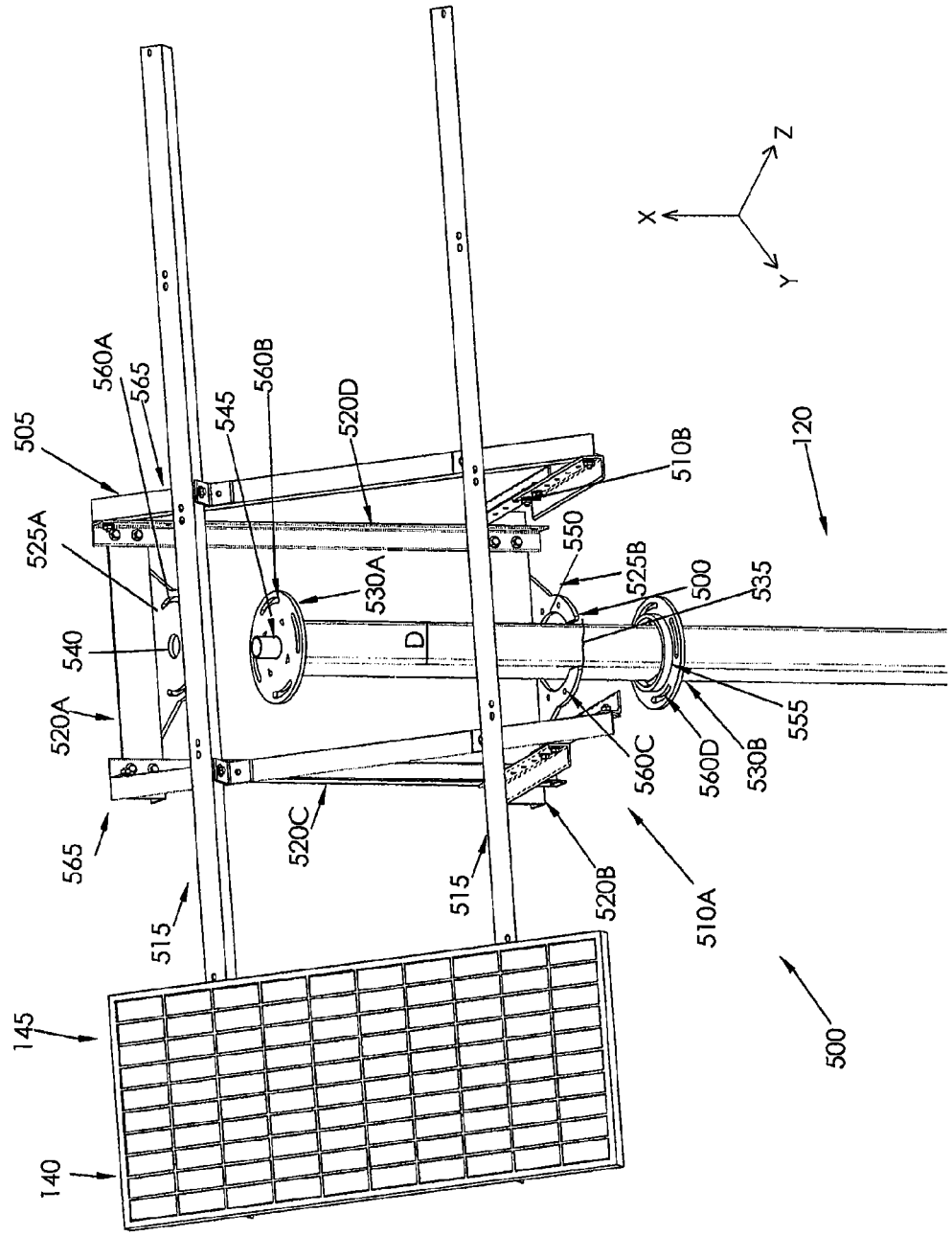

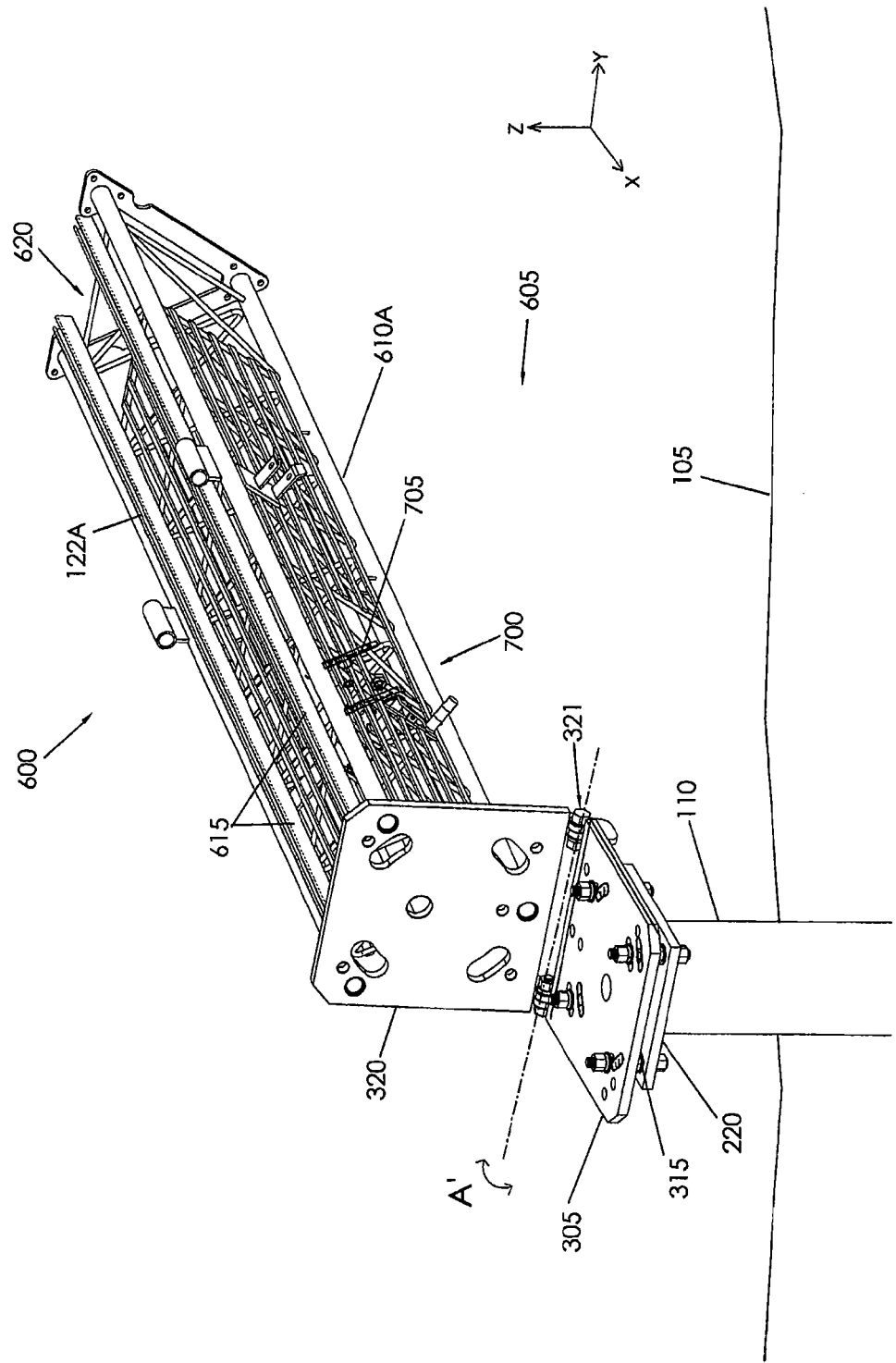

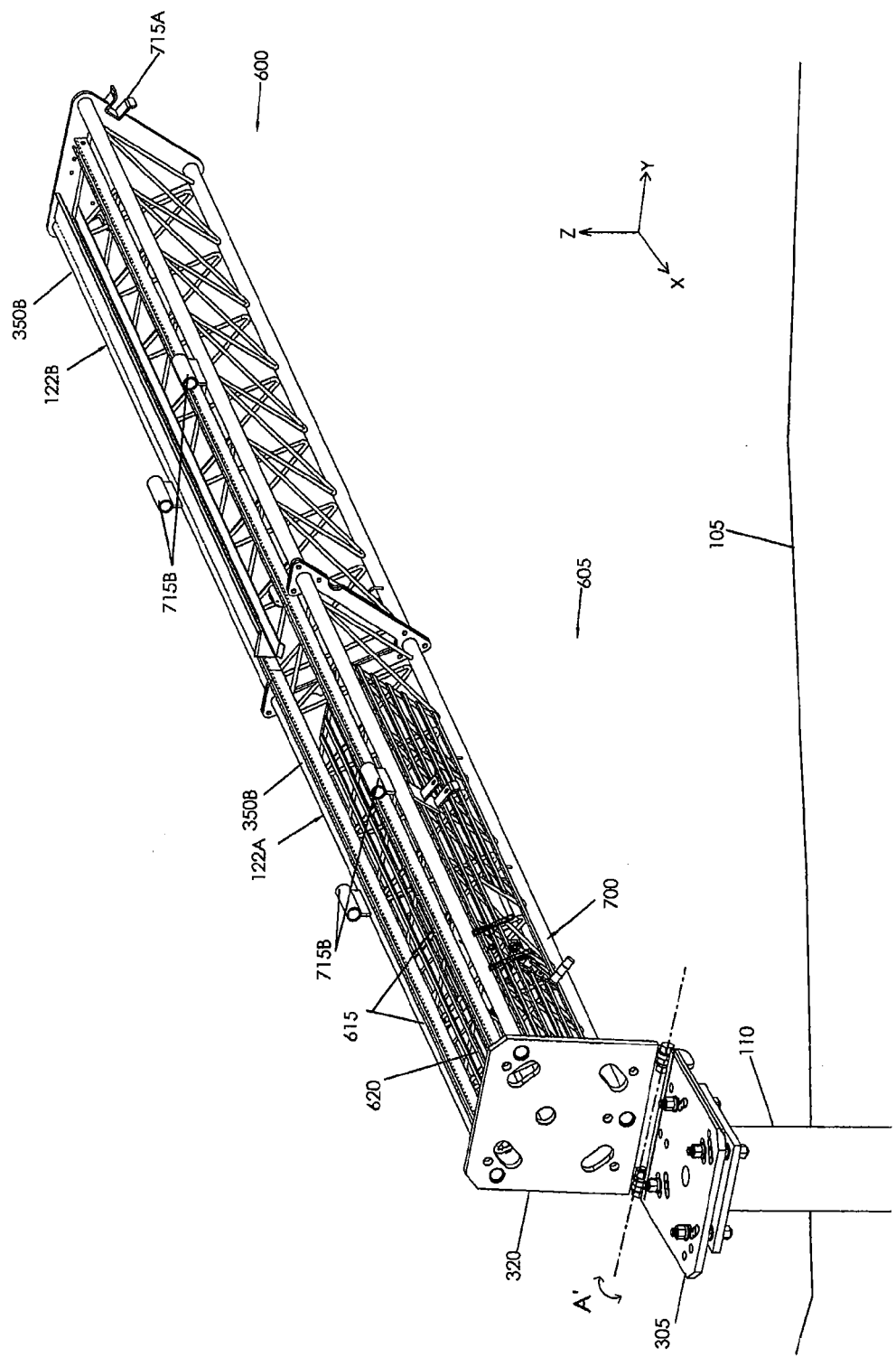

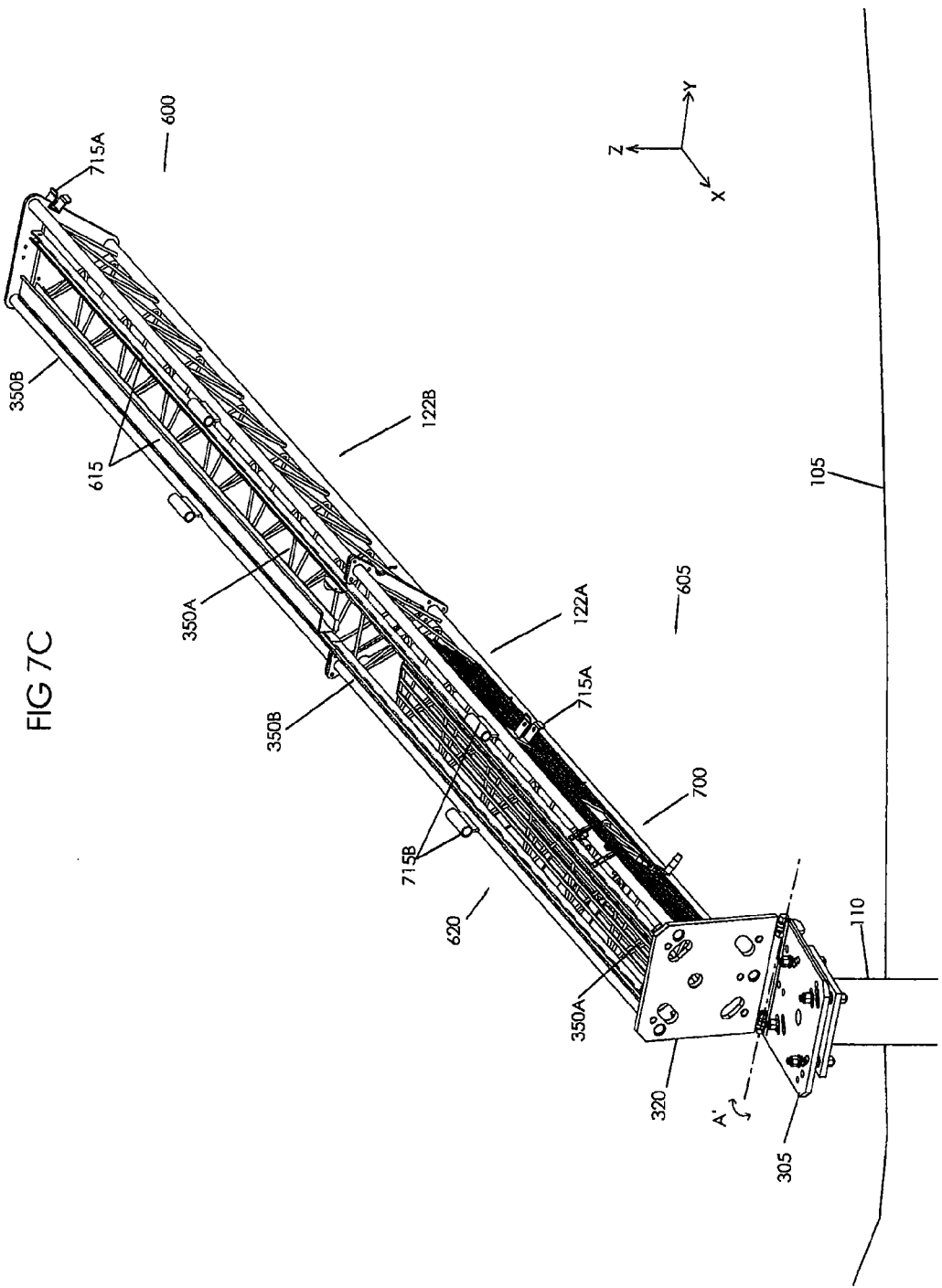

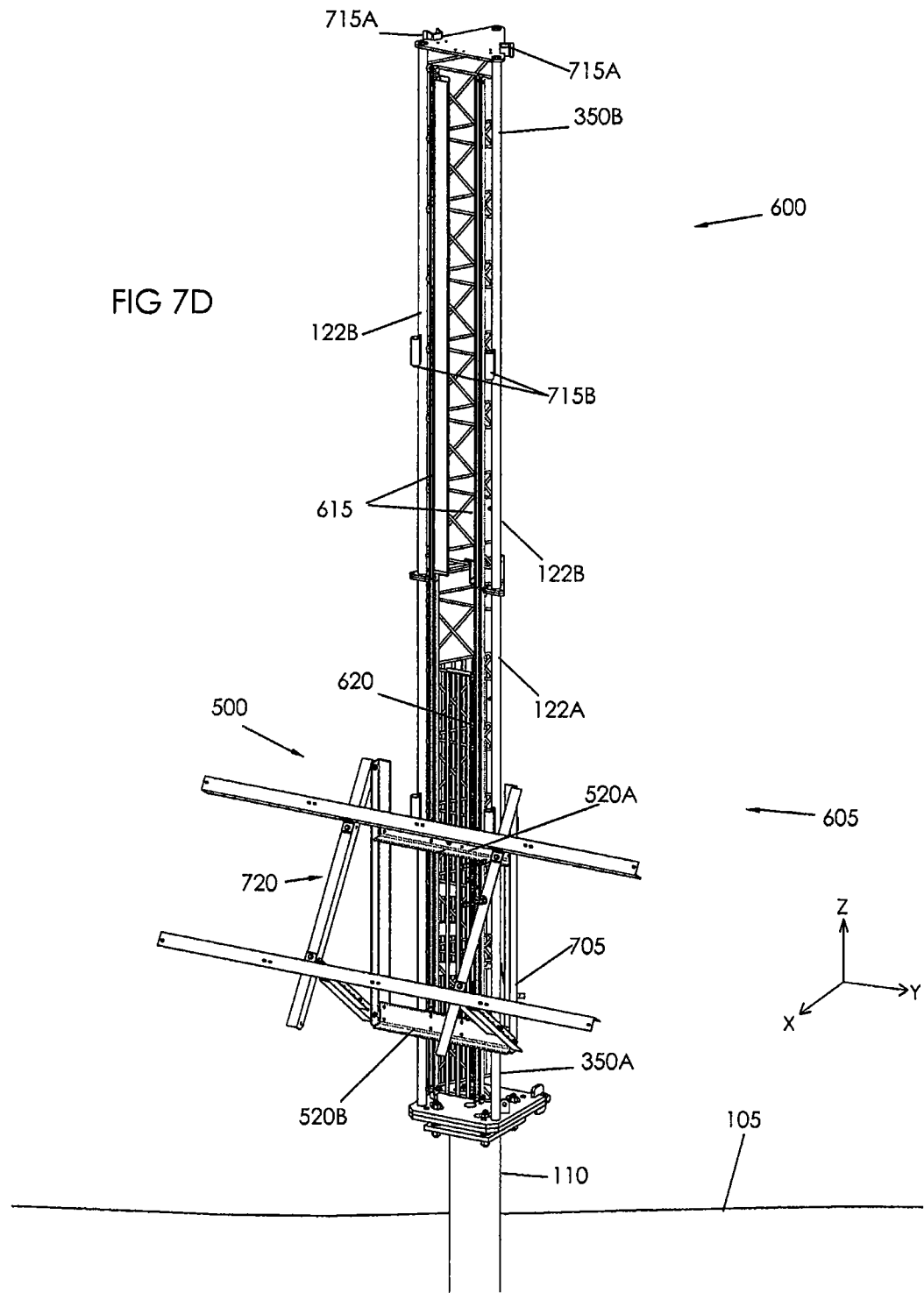

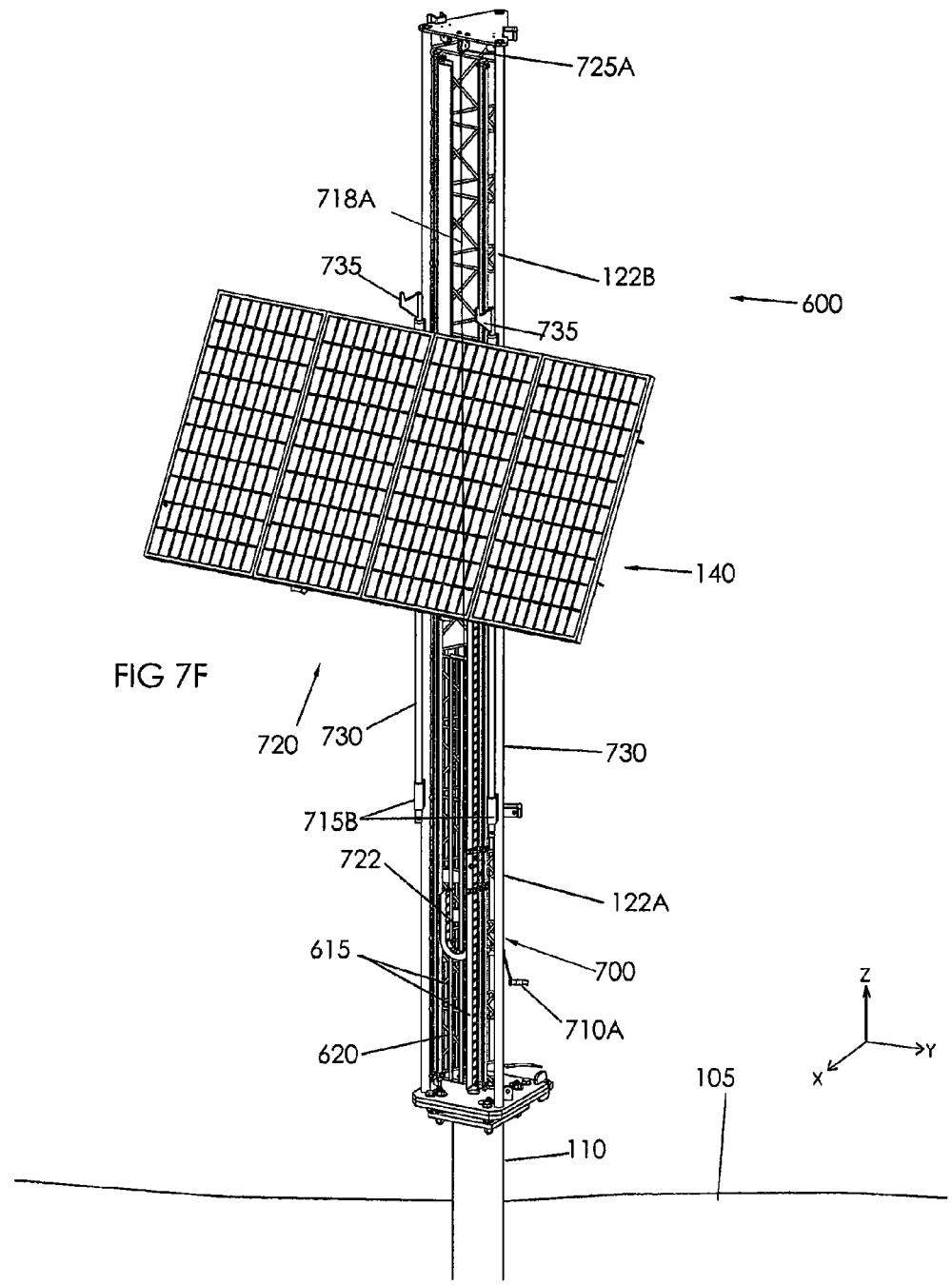

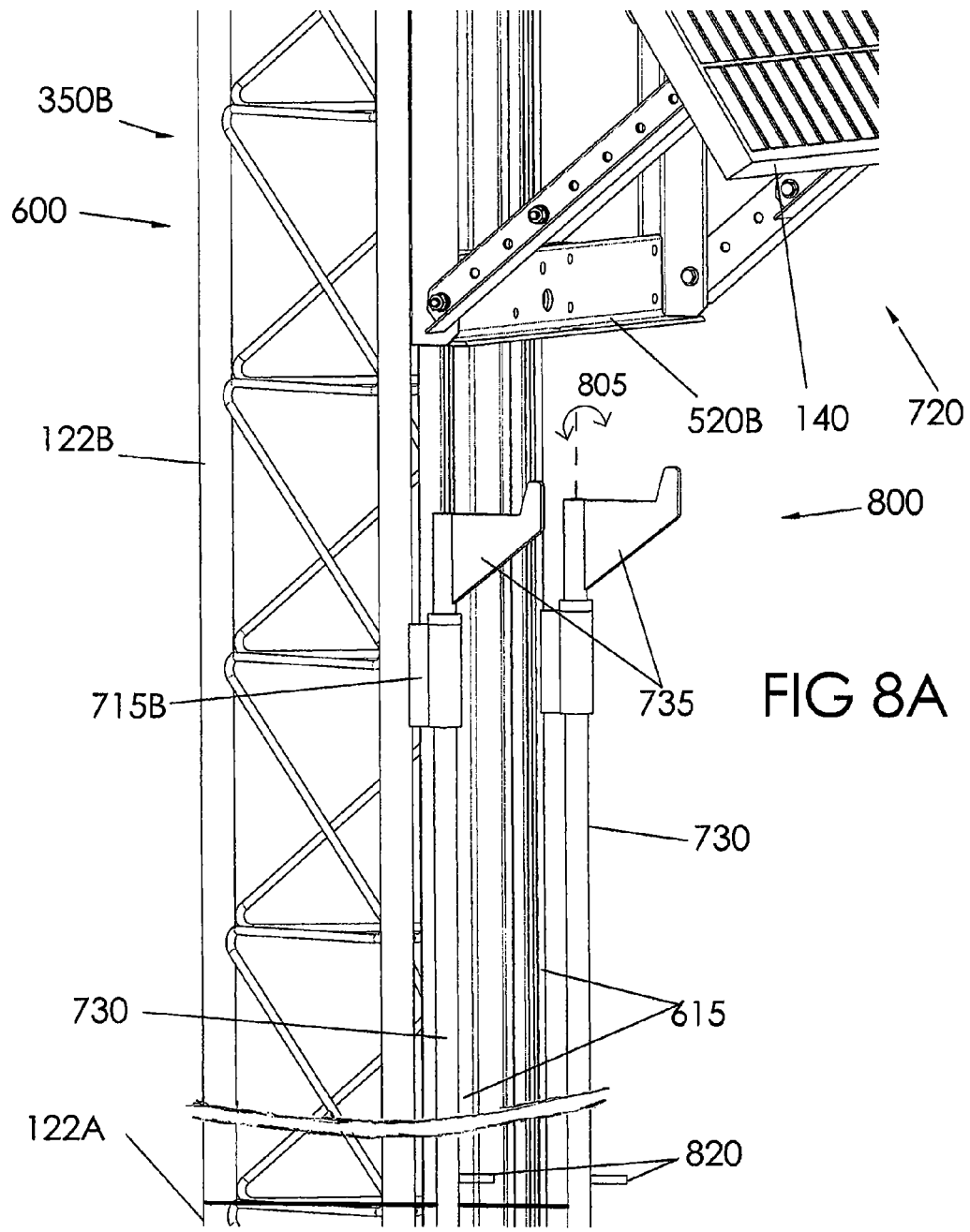

TOWER STRUCTURE

CROSS-REFERENCE TO RELATED APPLICATIONS

This application claims benefit of U.S. Provisional Patent Application Ser. No. 61/322,706, filed Apr. 9, 2010, which is incorporated herein by reference.

BACKGROUND OF THE INVENTION

1. Field of the Invention

Embodiments of the invention generally relate to tower structure apparatus utilized for power generation, communications, lighting, among other uses, and methods of erecting and/or servicing tower structure apparatus.

2. Description of the Related Art

Tower structures utilized for supporting aerial components, such as lighting, antennas, solar modules and wind generators, are known. The tower structures generally include a pole and/or a truss structure that is coupled to the ground. The tower structures may support the aerial components a few feet above the ground to thousands of feet above the ground and are designed to withstand high winds.

Conventional tower structures above about 15 feet tall are typically installed using heavy equipment, such as a crane, and multiple workers. The installation of these tower structures is costly since heavy equipment must be purchased or rented and transferred to the erection site. Further, the installation procedure can take many days. Additionally, once the conventional tower structure is installed, aerial components coupled to the structure are not easily accessible for servicing, inspection or replacement without the use of heavy equipment or personnel lift apparatus.

Therefore, there is a need for a new tower structure that is less costly to install and provides easy access to any aerial components disposed thereon.

SUMMARY OF THE INVENTION

Embodiments of the invention generally relate to a tower structure utilized to support aerial components, and methods of erecting and/or servicing the tower structure. In one embodiment, a tower structure is provided. The tower structure includes a base plate, a first structural section coupled to the base plate by a hinge, a second structural section pivotably coupled to the first structural section, and an aerial component coupled to the second structural section, wherein the first structural section is rotatable relative to the base plate at a first rotational axis, the second structural section is rotatable relative to the first structural section at a second rotational axis and at least a portion of the second structural section is received in a channel formed in the first structural section when the first structural section and the second structural section are substantially parallel.

In another embodiment, a tower structure is provided. The tower structure includes a base plate adapted to be coupled to a stationary base plate, a flange hingedly coupled to the base plate, the base plate and the flange being movable relative to each other in a first rotational axis, an intermediate structure coupled to the flange, and a mast structure coupled to the intermediate structure at a fulcrum providing movement of the mast structure in a second rotational axis relative to the intermediate structure, wherein the base plate has a first plurality of through-holes and a second plurality of through-holes, wherein each of the second plurality of through-holes are disposed in a position between each of the through-holes of the first plurality of through-holes, and the flange has a third plurality of though-holes that substantially align with the first plurality of through-holes in the base plate.

In another embodiment, a tower structure is provided. The tower structure includes a first hinged base plate adapted to be coupled to a stationary base plate, a second hinged base plate coupled to the first hinged base plate, the first hinged base plate and the second hinged base plate being movable relative to each other in a first rotational axis, a first structural section coupled to the second hinged base plate, the first structural section comprising a first side and a second side, a second structural section coupled to the first structural section at a fulcrum providing movement of the second structural section in a second rotational axis relative to the first structural section, and an aerial component coupled to the second structural section, wherein at least a portion of the second structural section is received in a channel formed in the first side of the first structural section when the first structural section and the second structural section are substantially parallel, the first hinged base plate has a first plurality of through-holes, and a second plurality of through-holes, wherein each of the second plurality of through-holes are disposed in a position between each of the through-holes of the first plurality of through-holes, and the second hinged base plate has a third plurality of though-holes and a fourth plurality of through-holes, the third plurality of through-holes substantially aligning with the first plurality of through-holes in the first hinged base plate and the fourth plurality of through-holes substantially aligning with the second plurality of through-holes in the first hinged base plate.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A is an isometric elevation view of one embodiment of a tower structure.

FIGS. 1B-1D are isometric views of embodiments of aerial components that may be coupled to the tower structure of FIG. 1A.

FIG. 3C shows a mast structure coupled to the intermediate structure of FIG. 3B.

FIG. 3D shows a portion of one embodiment of an installation sequence wherein the intermediate structure of FIG. 3C is being erected.

FIG. 3G shows the tower structure of FIG. 1A in a fully erected position.

FIG. 4A is a side cross-sectional view showing the tower structure of FIG. 1A in a partially erected position.

FIG. 4B is an isometric view of one embodiment of the intermediate structure of FIG. 4A and a portion of a mast structure in an upright position.

FIG. 5A is an isometric view of one embodiment of an aerial component that may be utilized on the tower structure of FIG. 1A.

FIG. 5B an isometric exploded view of the frame structure of the aerial component of FIG. 5A.

FIG. 7A shows a portion of one embodiment of an installation sequence of the tower structure of FIG. 6.

FIG. 7B shows a first articulating mast structure of FIG. 7A having at least two structural sections.

FIG. 7C shows the first articulating mast structure of FIG. 7B in a partially erected position.

FIG. 7D shows the first articulating mast structure of FIG. 7B in an upright position.

FIG. 7F shows the solar module and frame structure of FIG. 7E being lifted vertically.

FIGS. 8A and 8B show one embodiment of a safety system that may be utilized with the tower structure of FIG. 6.

Figures 2A, 2B, 2C:
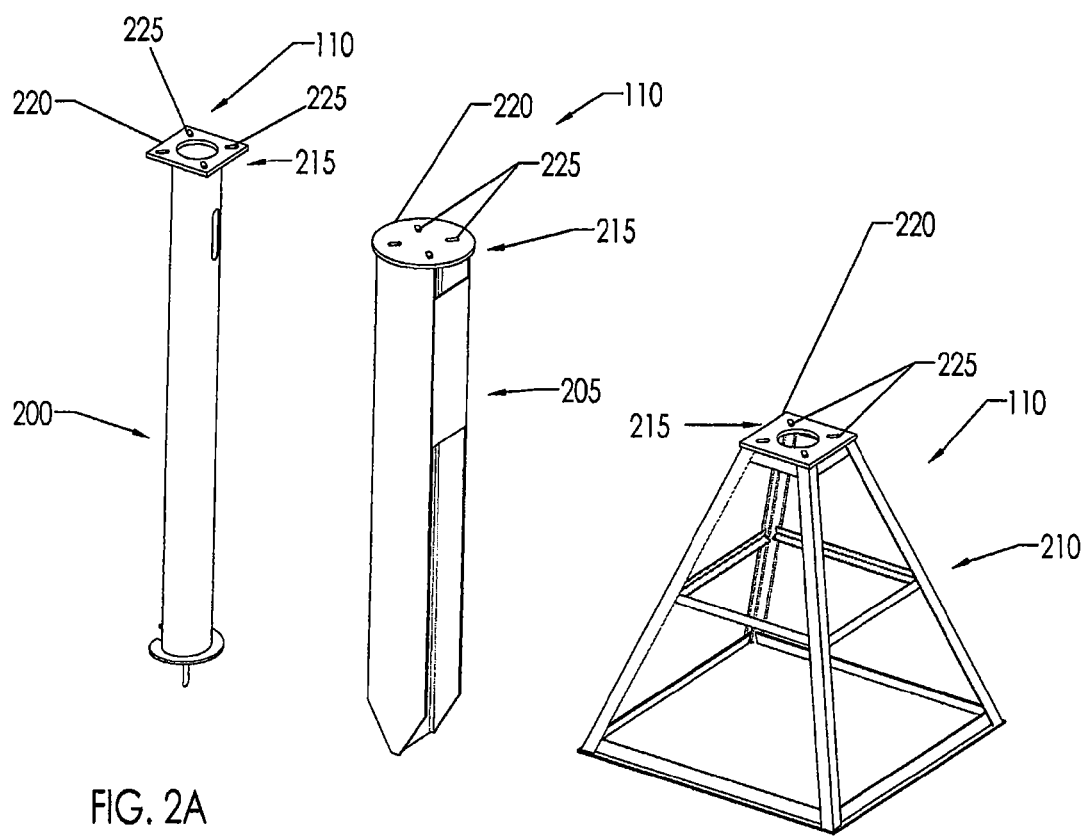
FIGS. 2A-2C show various embodiments of a base that may be utilized with the tower structure of FIG. 1A.

To facilitate understanding, identical reference numerals have been used, wherever possible, to designate identical elements that are common to the figures. It is contemplated that elements and/or process steps of one embodiment may be beneficially incorporated in other embodiments without additional recitation.

DETAILED DESCRIPTION

Embodiments of the invention generally relate to a tower structure utilized to support aerial components, and methods of erecting and/or servicing the tower structure. The aerial components as described herein may include power generation devices, power transmission devices, lighting devices, signal lights, communication devices, global positioning devices, satellite or microwave dishes, surveillance cameras, motion detectors, as well as flags, banners, signage, among other devices or articles adapted to be supported above the ground. Power generation devices include solar cells or solar arrays, wind generators, as well as other energy generators or energy collectors.

FIG. 1A is an isometric elevation view of one embodiment of a tower structure 100 coupled to the ground 105. The tower structure 100 includes a base 110 that is coupled to the ground 105, an intermediate structure 115 coupled to the base 110 and a mast structure 120 coupled to the intermediate structure 115. The tower structure 100 also includes an aerial component 125 coupled to the mast structure 120. In one embodiment, the base 110 comprises a first or lower portion, the intermediate structure 115 comprises a second portion, and the mast structure 120 comprises a third or upper portion. In one embodiment, the intermediate structure 115 and mast structure 120 may include one or more structural sections that may be coupled together during installation. The one or more structural sections may be tubular members, I beams, H beams, W beams, channels, or other structural members. The base 110, the intermediate structure 115 and the mast structure 120 may be made of steel, aluminum, or combinations thereof.

In one embodiment, at least the intermediate structure 115 and the mast structure 120 partially overlap in the erected position as shown. The base 110 is driven or otherwise anchored to the ground 105 and supports the intermediate structure 115. The intermediate structure 115 supports the mast structure 120, which supports the aerial component 125. In this embodiment, the aerial component 125 comprises a communications device, such as an antenna 130, and a component base 135. The component base 135 may be an end of the mast structure 120 or a discrete tubular member or frame structure that is coupled to the mast structure 120.

The tower structure 100 shown in FIG. 1A is configured to be erected on site without the use of crane. Further, the tower structure 100 may be constructed and erected using minimal heavy equipment and/or personnel. In one aspect, the tower structure 100 is adapted as a modular unit having multiple elements that are dimensioned to be handled manually by personnel during construction. In one example, the base 110, intermediate structure 115 and the mast structure 120 are dimensioned to facilitate handling by two people. In one aspect, each of the base 110, the intermediate structure 115, the mast structure 120 include a weight of less than about 250 pounds, such as less than about 200 pounds, to facilitate handling by two people.

FIGS. 1B-1D are isometric views of embodiments of aerial components 125 that may be coupled to the tower structure 100 of FIG. 1A. FIG. 1B depicts a solar module 140 containing one or more solar cells or solar panels 145. FIG. 10 depicts a turbine or wind generator 150. FIG. 1D depicts a lighting device 155 containing one or more lamps 160. The various embodiments of aerial components 125 shown in FIGS. 1A-1D may be used alone or in combination on the tower structure 100 depending on user needs.

FIGS. 2A-2C show various embodiments of a base 110 that may be utilized with the tower structure 100 as described herein. FIG. 2A is an isometric view of a helical pier 200 that may be coupled to the ground by one or a combination of rotation, pressure and vibration. FIG. 2B is an isometric view of a ground-penetrating pier 205 that may be coupled to the ground by one or a combination of pressure and vibration. The helical pier 200 and the ground-penetrating pier 205 may be coupled to the ground using a small skid steer machine or a back hoe tractor. The helical pier 200 and the ground-penetrating pier 205 may also be coupled to the ground by manually digging a hole and filling the hole with dirt, concrete, and/or gravel. FIG. 2C is an isometric view of a surface mounted foundation 210 that may be coupled to the ground by fasteners or anchors (not shown). Each of the helical pier 200, ground-penetrating pier 205 and surface mounted foundation 210 include an upper portion 215 having a stationary mounting plate 220. The stationary mounting plate 220 includes a plurality of though-holes 225 adapted to receive fasteners, such as bolts (not shown).

Figure 3A:
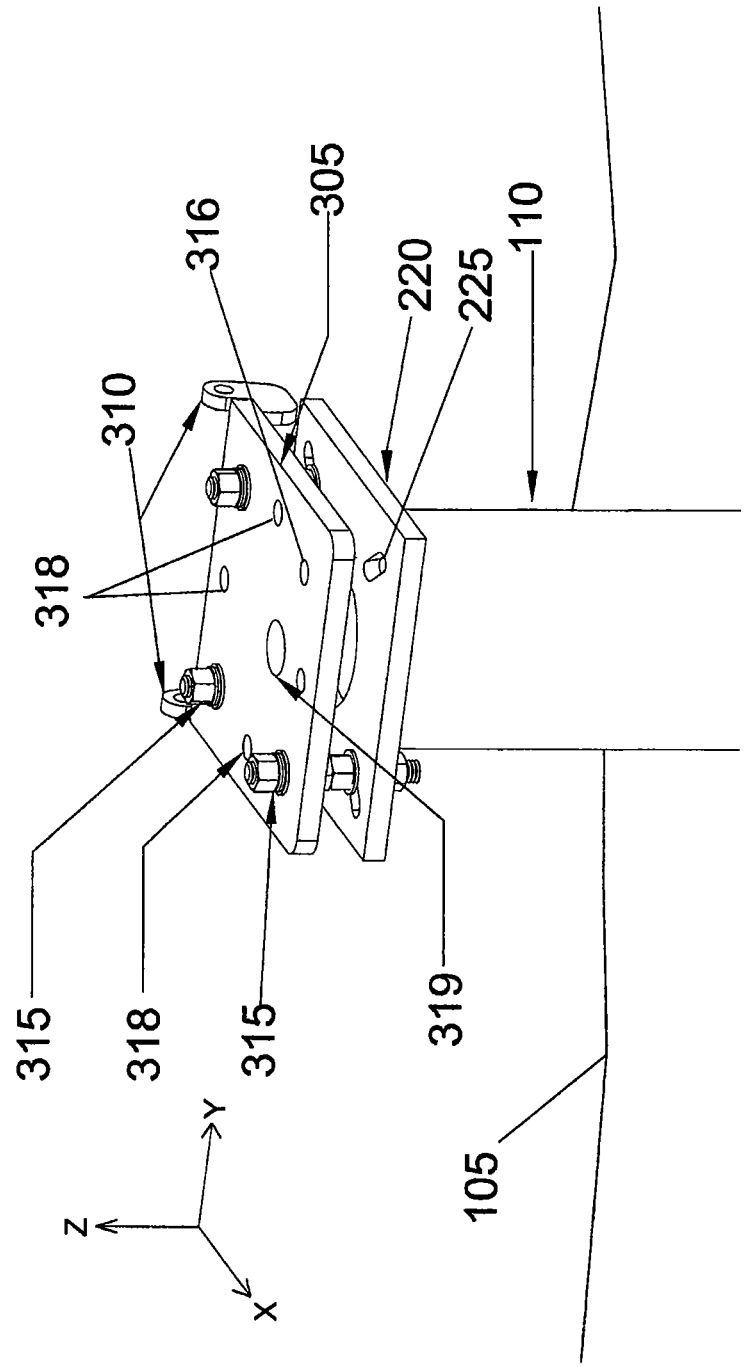
FIG. 3A shows a portion of one embodiment of an installation sequence for erecting the tower structure of FIG. 1A.

FIGS. 3A-3G depict schematic isometric views of one embodiment of an installation sequence for constructing and erecting the tower structure 100 of FIG. 1A. FIG. 3A shows a base 110 fixed to the ground 105. In one embodiment, a base plate 305 is coupled to the stationary mounting plate 220. The base plate 305 The base plate 305 includes one or more hinge members 310 that define at least a portion of a hinge mechanism. The base plate 305 may comprise a first hinged base plate that is coupled the base 110 by fasteners 315, such as bolts and/or nuts disposed in through-holes 316 (only one is shown) that substantially align with the through-holes 225 in the stationary mounting plate 220. The base plate 305 may be leveled and/or positioned in the X, Y and Z directions prior to tightening of the fasteners 315. The base plate 305 also includes through-holes 318 to receive fasteners (not shown) utilized in coupling other portions of the tower structure 100 to the base plate 305. The base plate 305 may also include a central through-hole 319 that may be utilized in routing wiring or communication cables through the base plate 305.

Figure 3B:
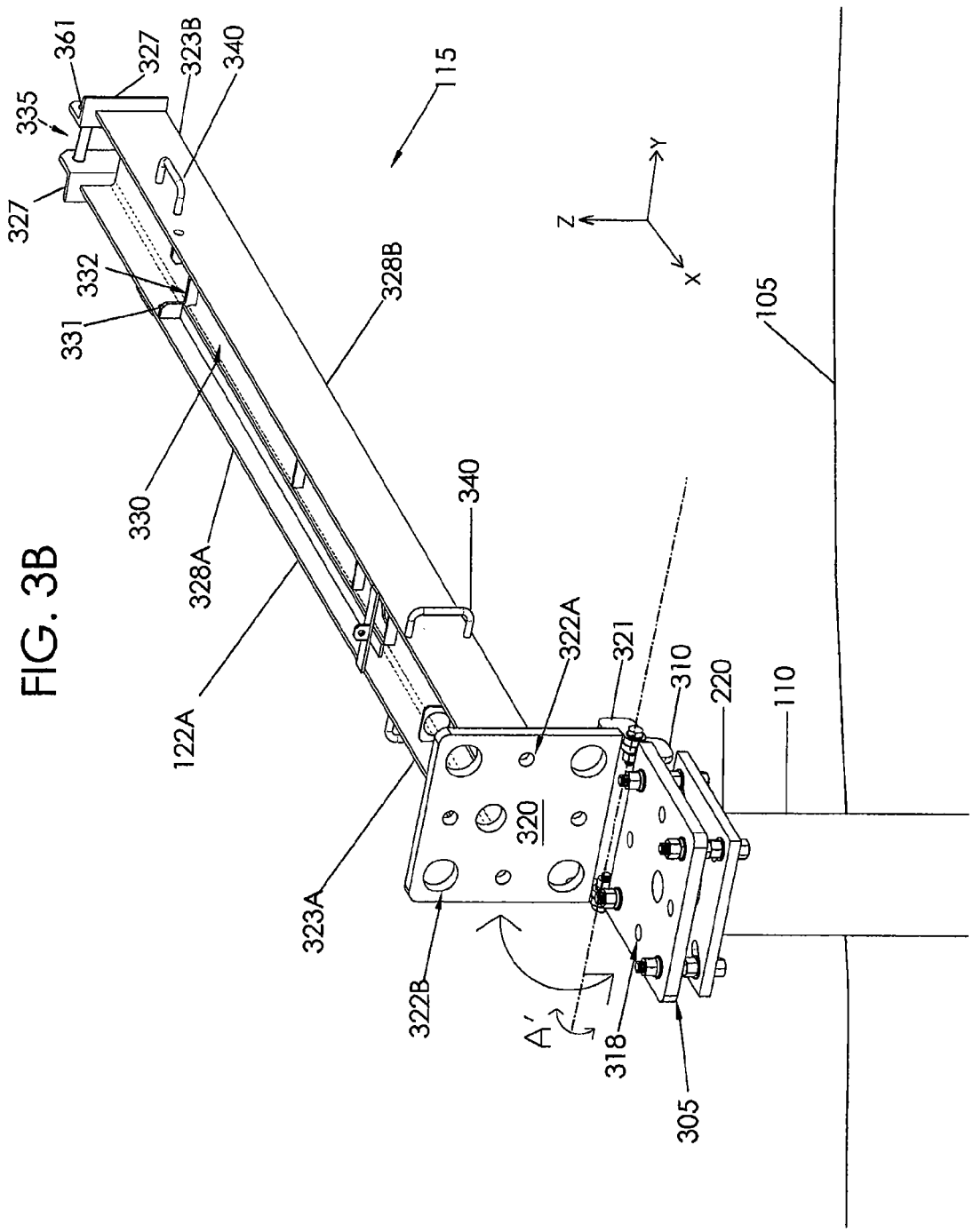
FIG. 3B shows a portion of one embodiment of an installation sequence where an intermediate structure is coupled to a hinged base plate of FIG. 3A.

FIG. 3B shows an intermediate structure 115 coupled to the base plate 305. In one embodiment, the intermediate structure 115 comprises a first structural section 122A having a first end 323A and a second end 323B. The intermediate structure 115 also includes a flange 320 coupled to the first end 323A of the first structural section 122A. The flange 320 includes hinge devices 321 adapted to mate with hinge devices 310 on the base plate 305. The flange 320 may comprise a second hinged base plate in one embodiment. The flange 320 is coupled to the base plate 305 by a hinge pin adapted to provide rotational movement of the flange 320 and the first structural section 122A relative to the base plate 305 along a first rotational axis A'. The intermediate structure 115 also includes a second mounting plate 326 positioned at the second end 323B of the first structural section 122A opposing the flange 320. The second mounting plate 326 may comprise substantially identical structural members 327 that are fastened to the second end 323B. In one embodiment, the structural members 327 are L shaped and may comprise angle stock, "C" channels or other structural shapes or castings formed in an L shape.

In one embodiment, the flange 320 includes through-holes 322A and 322B. The through-holes 322B are sized to receive a portion of the fasteners 315. The through-holes 322A are configured to align with the through-holes 318 on the base plate 305 when the flange 320 and the base plate 305 are in proximity to each other, such as when the intermediate structure 115 is in the upright position (Z direction). Fasteners (not shown) may be disposed in through-holes 318 and 322A in order to secure the flange 320 to the base plate 305 and the base 110.

In one embodiment, the base plate 305 has a first plurality of through-holes 316 and a second plurality of through-holes 318. Each of the through-holes 318 of the second plurality of through-holes are disposed between the through-holes 316 of the first plurality of through-holes. The flange 320 has a third plurality of through-holes 322A and a fourth plurality of through-holes 322B. Each of the through-holes 322B of the second plurality of through-holes are disposed between the through-holes 322A of the first plurality of through-holes. In one aspect, the third plurality of through-holes 322A substantially coaxially align with the first plurality of through-holes 316 and the fourth plurality of through-holes 322B substantially coaxially align with the second plurality of through-holes 318.

In another embodiment, the stationary mounting plate 220 disposed on the base 110 comprises a first mounting plate having a first plurality of through-holes 225. The first plurality of through-holes 225 are formed in a first bolt pattern on the first mounting plate. The base plate 305 comprises a first base plate that is coupled to the stationary mounting plate 220. The base plate 305 comprises a second plurality of through-holes 316 that are formed in a second bolt pattern on the base plate 305. In one embodiment, each of the second plurality of through-holes 316 substantially coaxially align with the first plurality of through-holes 225 in the stationary mounting plate 220. One or both of the first plurality of through-holes 225 and the second plurality of through-holes 316 may be configured as slots to allow adjustment in at least the X and Y directions. The base plate 305 also comprises a third plurality of through-holes 318. The third plurality of through-holes 318 are disposed between each of the second plurality of through-holes 316. The third plurality of through-holes 318 may be formed on the same bolt pattern as the second plurality of through-holes 316. The flange 320 may comprise a second base plate having a fourth plurality of through-holes 322A. The fourth plurality of through-holes 322A are disposed in a bolt pattern that substantially coaxially aligns with the third plurality of through-holes 318. The flange 320 also comprises a fifth plurality of through-holes 322B. The fifth plurality of through-holes 322B are formed between the fourth plurality of through-holes 322A. The fifth plurality of through-holes 322B are disposed in a bolt pattern that substantially coaxially aligns with one or both of the second plurality of through-holes 316 and the first plurality of through-holes 225. The configuration of the stationary mounting plate 220 (first mounting plate), the base plate 305 (first base plate) and the flange 320 (second base plate) provides a compact base mounting design having the capability of adjustment in the X, Y and Z directions while providing a hinged connection to facilitate ease of erection of the tower structure 100. Additionally, the base plate 305 may comprise a leveling plate. The base plate 305 may be leveled after coupling to the stationary mounting plate 220, which will facilitate levelness for the entire tower structure 100. Thus, leveling need only be performed once, which saves time and effort.

The first structural section 122A may be a tubular member, one or more "C" channels or angle stock, "I" beam, "H" beam, "W" beam or other structural member. The first structural section 122A includes at least a first side 328A and an opposing second side 328B. At least one of the first side 328A and second side 328B includes a channel 330 along a longitudinal axis thereof. In one embodiment, the second mounting plate 326 includes a cut-out portion 335 formed between the structural members 327. In one aspect, the channel 330 and the cut-out portion 335 are sized to receive at least a portion of the mast structure 120 (shown in FIG. 1A). A hinge pin, such as a bolt 361, may be disposed between the structural members 327. The bolt 361 is adapted to be disposed in a through-hole formed in the mast structure 120. The channel 330 may also include a spacer bracket 331 disposed therein. The spacer bracket 331 includes a cut-out region 332 that is sized to substantially match an outside dimension of the mast structure 120. For example, the cut-out region 332 is sized to receive a diameter or a width dimension of the mast structure 120. The spacer bracket 331 may also provide an alignment function to substantially center the mast structure 120 within the channel 330.

The intermediate structure 115 is sized to allow personnel to transport, position and easily attach the first structural section 122A to the base 110. In one embodiment, the first structural section 122A includes handles 340 to facilitate handling of the first structural section 122A. In one embodiment, the weight of intermediate structure 115 is less than about 200 pounds. In one embodiment, intermediate structure 115 also includes a winch device 345 integral to first structural section 122A (partially shown in this view). The winch device 345 is mounted on the second side 328B opposite the channel 330. The winch device 345 is utilized to facilitate erection of the tower structure 100, as will be explained in greater detail below.

FIG. 3C shows the mast structure 120 coupled to the intermediate structure 115. In this embodiment, mast structure 120 is an extended member including at least one structural section shown as structural section 122A. Structural section 122A includes a first end 350A and a second end 350B. The second end 350B of the structural section 122A may be utilized to attach aerial components 125 (FIGS. 1A-1D) or attach additional structural sections. In this embodiment, a component base 135 is attached to the second end 350B of the structural section 122A.

The structural section 122A is adapted to pivotably couple to the intermediate structure 115 at a rotatable interface, such as a fulcrum 360. In one embodiment, the fulcrum 360 includes a hinged or rotatable coupling device formed by the second mounting plate 326 and an opening (not shown) disposed on the structural section 122A. A hinge pin, such as the bolt 361 may be coupled between the intermediate structure 115 and the opening disposed on the section 122A. In one embodiment, the fulcrum 360 is configured as a pivot point adapted to provide relative movement between mast structure 120 and intermediate structure 115 about a second rotational axis A".

In one embodiment, mast structure 120 includes a length L and the fulcrum 360 is located within the length L such that first end 350A is utilized as a counterweight during rotation of the mast structure 120. For example, the fulcrum 360 may be located on the mast structure 120 at a distance D' between first end 350A and the fulcrum 360 and a distance D" between the second end 350B and the fulcrum 360. In one embodiment, the distance D' is less than the distance D". In another embodiment, the distance D' is about 2 times less than the distance D". In another embodiment, the distance D' is about ⅓ of the length L of the mast structure 120, or less. In another embodiment, the distance D' is about ¼ of the length L of the mast structure 120. In another embodiment, the distance D' is about ⅛ of the length L of the mast structure 120.

Figure 3E:
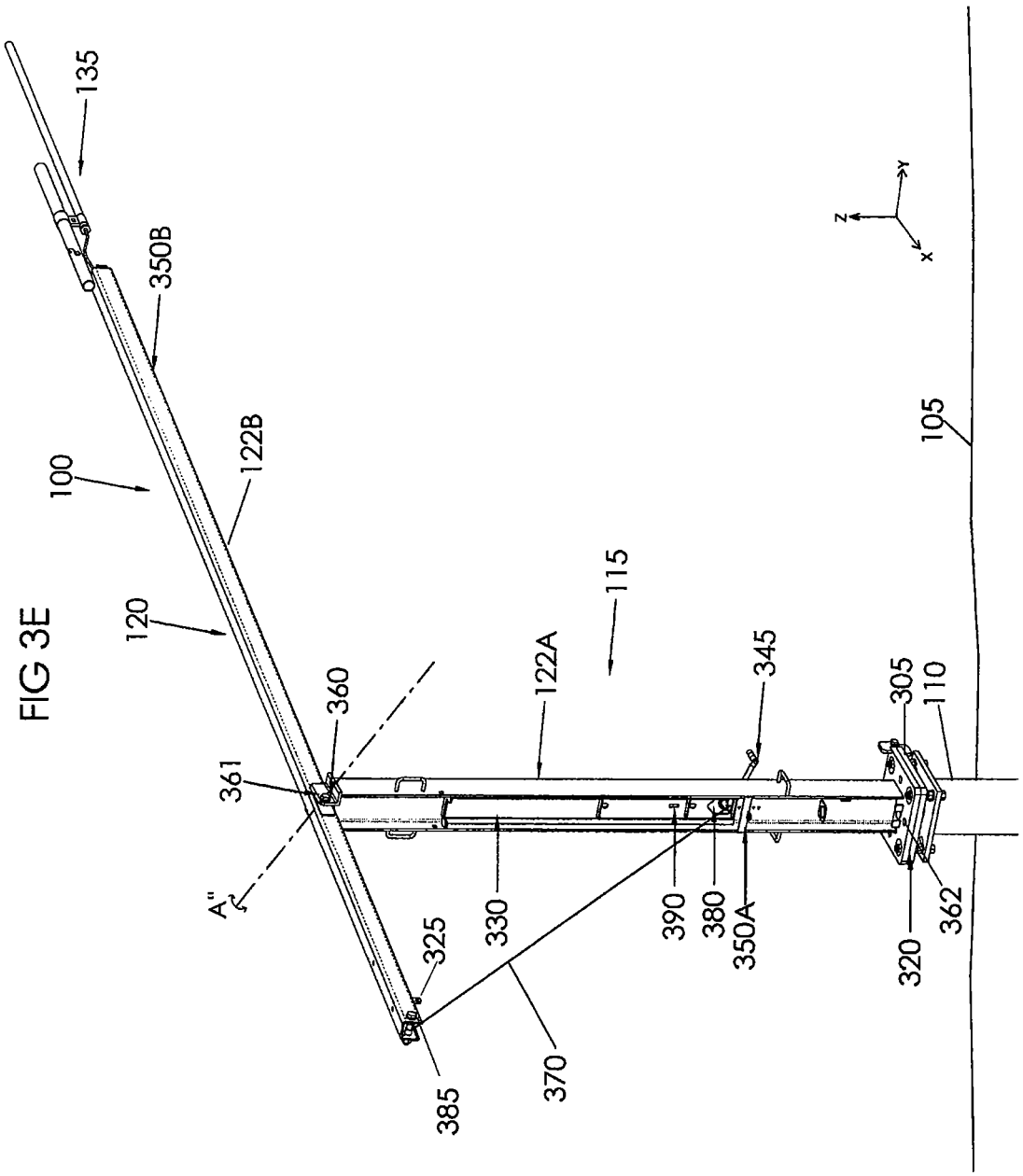
FIG. 3E shows the intermediate structure of FIG. 3C in an upright position.
Figure 3F:
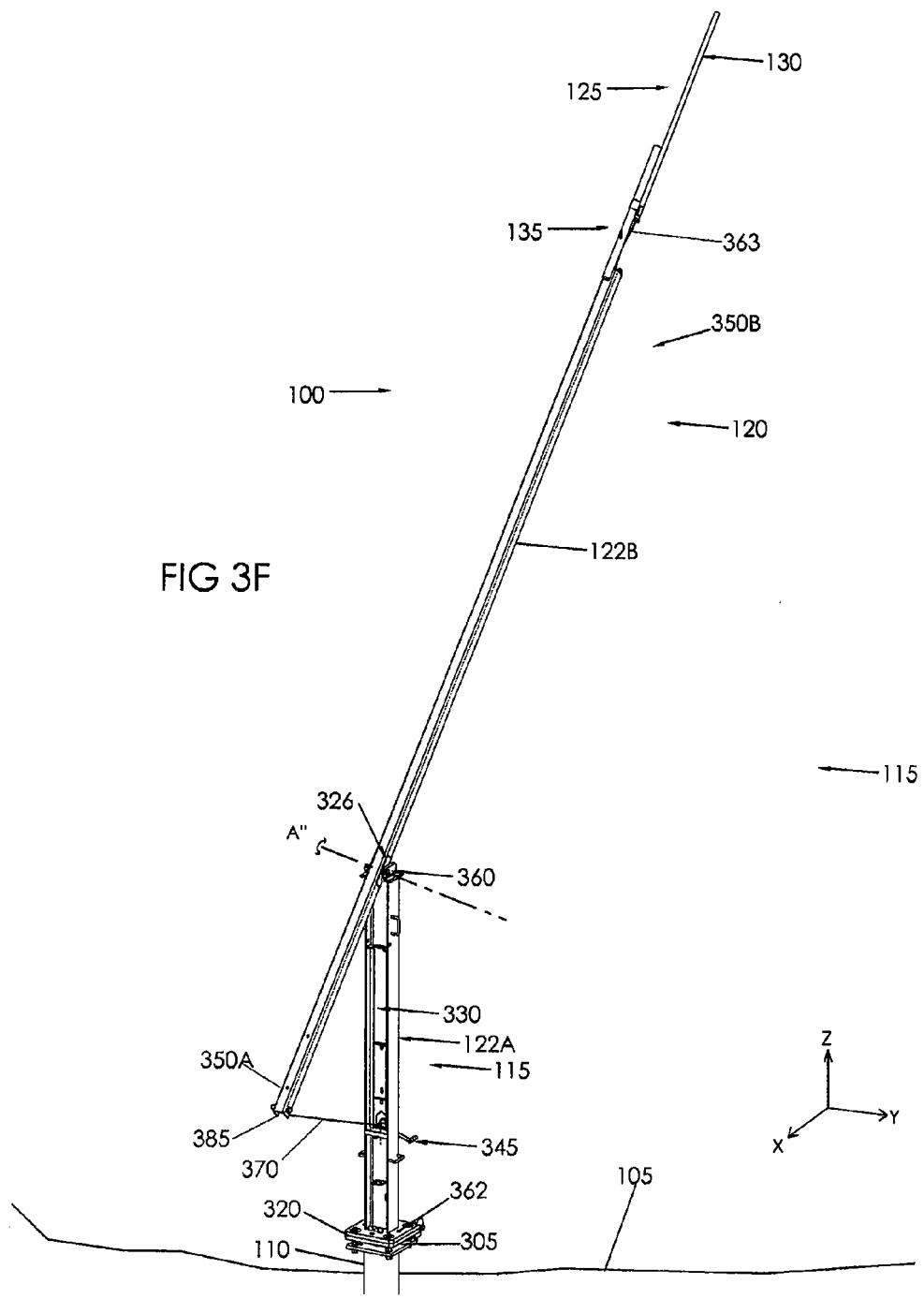
FIG. 3F shows an antenna coupled to mast structure of FIG. 3C.

FIGS. 3D-3F show the tower structure 100 in a partially erected position. FIG. 3D shows the first structural section 122A being pushed and/or pulled in or toward the Y direction by personnel and/or with the assistance of light machinery (not shown), such as a manual or powered winch device, a block and tackle, a vehicle, a small tractor or skid steer loader. As the first structural section 122A is moved in the Y direction, the first structural section 122A is pivoted about the first rotational axis A' while the second structural section 122B is rotated relative to the first structural section 122A about the second rotational axis A". As the first structural section 122A is moved, the first end 350A of the second structural section 122B is moved away from the first structural section 122A to expose the channel 330. During the movement of the first structural section 122A in the Y direction, the second end 350B of the second structural section 122B and/or the component base 135 may be in contact with or at least partially supported by the ground 105. As the first structural section 122A is raised vertically, the second end 350B of the mast structure 120 and/or the component base 135 may slide along the ground 105.

FIG. 3D also shows a cable 370 attached to the first end 350A of the second structural section 122B through a first opening 380 formed in a wall of the first structural section 122A. The cable 370 may be attached to an attachment device, such a pin 385 disposed on the first end 350A of the second structural section 122B. The other end of the cable 370 is attached to the winch device 345. As the first structural section 122A is moved in the Y direction during this portion of the erection sequence, the cable 370 is allowed to be slack thereby allowing the second end 350B of the second structural section 122B to be supported at or near ground level. In one embodiment, a lug 325 is disposed on the first end 350A of the second structural section 122B inward of the pin 385. The lug 325 extends from a surface of the second structural section 122B and is configured to be inserted into a second opening 390 formed in a wall of the first structural section 122A. The lug 325 includes a through-hole (not shown) adapted to receive a locking device (not shown), such as a pin or a padlock to prevent tampering with the tower structure 100.

FIG. 3E shows the intermediate structure 115 in an upright position. As the tower structure 100 is in this position, personnel may attach aerial components 125 to the mast structure 120 and/or the component base 135. The mast structure 120 may be lifted and supported slightly above the ground 105 to facilitate attachment of the aerial components 125 (shown in FIGS. 1A-1D) to the mast structure 120 and/or the component base 135. To facilitate attachment of the aerial components 125, the winch device 345 may be actuated to rotate the mast structure 120 about the axis A" to lift second end 350B away from ground 105. The winch device 345 may be stopped and locked when the second end 350B is a suitable height above ground 105. The winch device 345 may be locked to support the second end 350B and prevent the mast structure 120 from rotating and/or moving during installation of the aerial component(s) 125. Support devices (not shown), such as sawhorses or jack stands, may be utilized to support the mast structure 120 in this position.

FIG. 3F shows an antenna 130 coupled to mast structure 120 in this embodiment. The antenna 130 may be installed on the second structural section 122B while the second structural section 122B is at or near ground level as shown and described in FIG. 3E. Signal cables 363, such as power or signal cables, may be attached to the antenna 130 in the position shown and described in FIG. 3E. The signal cables 363 may be coupled to an exterior of the mast structure 120 by fasteners (not shown), such as clips or wire ties. Alternatively, the signal cables 363 may be disposed inside an annulus of the second structural section 122B when a tubular mast structure is used. The winch assembly 345 is actuated to further raise the second end 350B of the second structural section 122B by rotation of the second structural section 122B relative to the first structural section 122A about axis A".

FIG. 3G shows the tower structure 100 in a fully erected position wherein the second structural section 122B is substantially vertical (Z direction). The mast structure 120 is shown at least partially received in the channel 330 of the intermediate structure 115. In one embodiment, the mast structure 120 is substantially coaxial with the intermediate structure 115 in the upright position as the mast structure 120 is at least partially received in the channel 330. The first end 350A is received in the channel 330 in proximity to first structural section 122A. In one embodiment, the mast structure 120 is substantially parallel with the intermediate structure 115 when the mast structure 120 is at least partially received in the channel 330. The substantially parallel orientation may be when the mast structure 120 and the intermediate structure are on the ground 105 during installation, as shown in FIG. 3C, or when the tower structure 100 is erected, as shown in FIG. 3G. The first end 350A may be coupled to the first structural section 122A using fasteners, such as bolts 362, to secure mast structure 120 to intermediate structure 115. In the position shown in FIG. 3G, the tower structure 100 is completely erected and the signal cable 363 from the antenna 130 from the may be attached to a junction box 375 mounted to the first structural section 122A. In some embodiments, a junction box 375 is not utilized and the signal cable 363 is coupled directly from the antenna 130 to a panel within a control station (not shown) adjacent the tower structure 100 to prevent any breaks in the signal cable 363.

Embodiments of the tower structure 100 as described herein are adapted to be erected using a Class I lever. For example, the second rotational axis A" may comprise a Class I lever to provide rotation of the mast structure 120 relative to the intermediate structure 115 in a controlled trebuchet type motion.

It is noted that if maintenance or inspection of the tower structure 100 is necessary, the tower structure 100 may be at least partially deconstructed. For example, if maintenance of the mast structure 120 and/or servicing or replacement of the antenna 130 is necessary, the bolts 362 securing mast structure 120 to the intermediate structure 115 may be removed. The winch device 345 may be actuated in a direction to lower the second end 350B toward the ground 105. The winch device 345 may be stopped when the second end 350B is a suitable height above the ground 105. The winch device 345 may be locked to support the second end 350B and prevent the mast structure 120 from rotating and/or moving during maintenance or inspection of the tower structure 100. The tower structure 100 may be re-erected as described and shown in FIGS. 3E-3G after maintenance and/or servicing.

FIG. 4A is a side cross-sectional view showing the tower structure 100 in a partially erected position wherein the mast structure 120 is at least partially supported by the cable 370 and the winch device 345. The winch device 345 includes a spool 410 and a ratchet assembly 412 coupled to a handle 415. In one embodiment, the handle 415 may be removed to facilitate attachment of a drill motor to the ratchet assembly 412. This facilitates powered rotation of the spool 410 instead of manual rotation of the handle 415 when rotating the mast structure 120 relative to the intermediate structure 115. The cable 370 may be coupled to the pin 385 disposed on the first end 350A of the mast structure 120. A bolt 361 is shown coupled to mast structure 120 at the fulcrum 360 facilitating rotation of mast structure 120 relative to the intermediate structure 115. In this view, a signal cable 363 is shown disposed in or on the intermediate structure 115 and mast structure 120. In one embodiment, signal cable 363 is disposed in one or more cable retainers 435 formed on the intermediate structure 115. Each of the cable retainers 435 may be extended members made of steel or aluminum that form at least a partial cable pathway or cable tray 440 within the channel 330. The cable retainers 435 and/or cable tray 440 is utilized to protect the signal cable 363 from damage. For example, when the first end 350A of the mast structure 120 is received in channel 330, the cable retainers 435 and/or cable tray 440 are utilized as a stand-off to prevent the first end 350A of the mast structure 120 from pinching or cutting the signal cable 363. Also shown in FIG. 4A is a cover 445 that houses the winch assembly 345 (with the handle 415 removed). The cover 445 is removable and may be coupled and/or padlocked to the intermediate structure 115 to prevent tampering with the winch assembly 345. The handle 415 may be removed from the ratchet assembly 412 and stored within the cover 445 for subsequent use.

Embodiments of the tower structure 100 described herein facilitate a path for the signal cable 363 that provides a continuous cable path from an aerial component (not shown) to a control station 450 adjacent the tower structure 100. The continuous cable path minimizes cutting and/or splicing of the signal cable 363 during installation of the tower structure 100. For example, the signal cable 363 may be coupled to the aerial component as the aerial component is installed on the mast structure 120. The signal cable 363 may then be routed through an annulus of the mast structure 120 or otherwise coupled thereto. The signal cable 363 may then be routed through the cable tray 440 on the intermediate structure 115, through holes in the plates 320, 305 and 220, and into the base 110. The signal cable 363 may then be routed underground to the control station 450. At least a portion of the routing of the signal cable 363 may be completed prior to lifting of the mast structure 120. Thus, a continuous path for the signal cable 363 is provided, which prevents cutting and splicing of the signal cable 363. This is particularly important when the signal cable 363 comprises coaxial cable. Coaxial cable is difficult to splice efficiently. Further, even if the splice is done correctly, the splicing operation takes considerable time and the cable may suffer some signal loss at each splice. Thus, cuts or breaks in the signal cable 363 that require splicing or coupling to junction boxes are to be avoided, if possible. The tower structure 100 as described herein solves this problem by providing a continuous path for the signal cable 363 from the aerial component to the control station 450, which minimizes installation time and facilitates maximum signal integrity. Continuous as used herein refers to a signal cable 363 that contains no cross-sectional breaks, splices or intervening devices, such as switches, junction boxes, and the like. The aspect of routing signal cables 363 during installation of the tower structure 100, particularly routing of the signal cables 363 when the majority of the tower structure 100 is at ground level, provides a benefit over conventional tower installation. For example, installation of the signal cables 363 in the tower structure 100 as described herein does not require climbing or personnel lifting apparatus. This increases safety of personnel during erection of the tower structure 100, decreases installation costs, and saves time. Additionally, when the tower structure 100 is erected or serviced, the signal cable 363 is protected during movement of the mast structure 120 so the signal cable is not stretched or pinched, which could damage the signal cable 363. This aspect saves time and installation costs, as well as protecting the integrity of the signal cable 363.

The path for the signal cable 363 as described herein also prevents tampering or theft of the signal cable 363. The signal cable 363 is generally protected and/or housed above ground level by the first and second structural sections 122A, 122B. To prevent tampering with the signal cable 363 at ground level, a cover 455 may be coupled to the first side 328A of the first structural section 122A. The cover 455 may be coupled to a lug and padlocked to cover a portion of the channel 330 that is not occupied by the mast structure 120 in an upright position. The cover 455 is utilized to prevent tampering or theft of the signal cable 363. Thus, the cable path provided by the tower structure 100 as described herein lowers cost of ownership by minimizing splicing and preventing tampering of the signal cable 363.

FIG. 4B is an isometric view of one embodiment of the intermediate structure 115 showing the second side 328B of the first structural section 122A and a portion of the mast structure 120 in an upright position. Fasteners, such as one or more bolts 362 secure the first end 350A of the mast structure 120. The winch device 345 is shown coupled to the second side 328B of the first structural section 122A. The lug 325 is shown in FIG. 4B disposed through the second opening 390 formed in the first structural section 122A. In one embodiment, the lug 325 is configured as an anti-tampering device. For example, a locking device (not shown), such as a padlock, may be attached to the lug 325 to minimize tampering with the tower structure 100 in the erected position.

Embodiments of the tower structure 100 as described herein provide a continuous path for the signal cable 363 from aerial components 125 to the ground 105, which eliminates splicing and minimizes construction time. Additionally, the tower structure 100 provides protection of the signal cable 363 by substantially enclosing the signal cable 363, which prevents deterioration and/or vandalism.

FIG. 5A is an isometric view of one embodiment of an aerial component 125 that may be utilized on the tower structure 100 as described herein. In this embodiment, the aerial component 125 comprises a solar module 140 having one or more solar panels 145 mounted on a modular frame structure 500. The frame structure 500 is shown coupled to the second end 350B of the mast structure 120. In this embodiment, the frame structure 500 is configured to support five solar panels 145 although only three are shown to show portions of the frame structure 500. The frame structure 500 may also be configured to support more or less than five solar panels 145.

The frame structure 500 is modular to enable ease of construction and may be assembled on-site and/or on the mast structure 120 by one or more persons. In one embodiment, the frame structure 500 contains a base frame 505, one or more adjustment assemblies 510A, 510B, and a plurality of frame elements 515. In one aspect, base frame 505 contains structural members 520A-520D that are fastened together to define a frame. The structural members 520A-520D and/or the frame elements 515 may be angle stock, tubing, "C" channels, among other structural shapes, which may be welded, bolted, screwed or riveted together. Likewise, the solar panels 145 may be attached to the structural members 520A-520D and/or the frame elements 515 utilizing fasteners, such as bolts or screws.

In one embodiment, the structural members 520A and 520B include rotatable base plates 525A and 525B, respectively. Each of the rotatable base plates 525A, 525B are adapted to be supported by and rotatable relative to fixed base plates 530A, 530B (only 530B is shown in this view) coupled to second end 350B of mast structure 120. The interface between rotatable base plates 525A, 525B and fixed base plates 530A, 530B provide rotation of frame structure 500 about third rotational axis A'''.

FIG. 5B an isometric exploded view of the frame structure 500 of FIG. 5A. In this view, only one solar panel 145 shown for clarity and the frame structure 500 is exploded away from the mast structure 120. The frame structure 500 may be modularly constructed in order to minimize weight during construction and enable one to two persons to install the frame structure 500 without the use of lifting devices, such as a crane. In one method of construction of the frame structure 500, base frame 505 may be coupled together and installed on the mast structure 120. Structural members 520A-520D may be coupled together to form the base frame 505 and the base frame 505 may be coupled to the mast structure 120. To ease coupling of the base frame 505 to the mast structure 120, the rotatable base plate 525B includes a cut-out portion 535 that is sized greater than an outer dimension D of the mast structure 120. The base frame 505 may be installed on mast structure 120 by guiding the rotatable base plate 525B in the Z direction utilizing the cut-out portion 535 to clear the outer dimension D of the mast structure 120.

Thereafter, base frame 505 may be guided in the X direction to allow a central opening 540 in the rotatable base plate 525 to receive an axle 545 that is fastened to the mast structure 120. In one embodiment, the rotatable base plate 525B includes an inside diameter 550 that is adapted to receive an outer diameter of a ring 555 coupled to the fixed base plate 530B. The rotatable base plate 525B may be positioned such that the inside diameter 550 is received by the outer diameter of the ring 555. In one embodiment, a washer (not shown) may be disposed between the rotatable base plates 525A, 525B and the fixed base plates 530A, 530B to facilitate rotation of base frame 505 about rotational axis A''' (shown in FIG. 5A). Fasteners (not shown) may be provided in openings 560A-560D in rotatable base plates 525A, 525B and the fixed base plates 530A, 530B. The base frame 505 may be positioned in a desired rotational orientation relative to the mast structure 120. Once the rotational orientation is determined, the fasteners in the openings 560A-560D in the rotatable base plates 525A, 525B and the fixed base plates 530A, 530B may be tightened. In one embodiment, the rotational orientation is the desired directional position of the solar panels 145 relative to the earth's magnetic field to facilitate maximum exposure of the solar panels 145 to the sunlight. In one aspect, the rotational orientation is South or a Southern direction.

Once the base frame 505 is fastened to the mast structure 120, the adjustment assemblies 510A, 510B and cross-members 565 may be attached to the base frame 505. The adjustment assemblies 510A, 510B and the cross-members 565 may be angle stock, tubing, "C" channels, among other structural shapes, which may be bolted, screwed or riveted together. The adjustment assemblies 510A, 510B may be adjusted to provide a desired angle of the cross-members 565 relative to the base frame 505 and/or the longitudinal axis of the mast structure 120. Once the adjustment assemblies 510A, 510B and cross-members 565 have been fastened to the base frame 505, the frame elements 515 and solar panels 145 may be coupled to the frame structure 500 and the mast structure 120 may be lifted as described in FIGS. 3F-3G.

Figure 6:
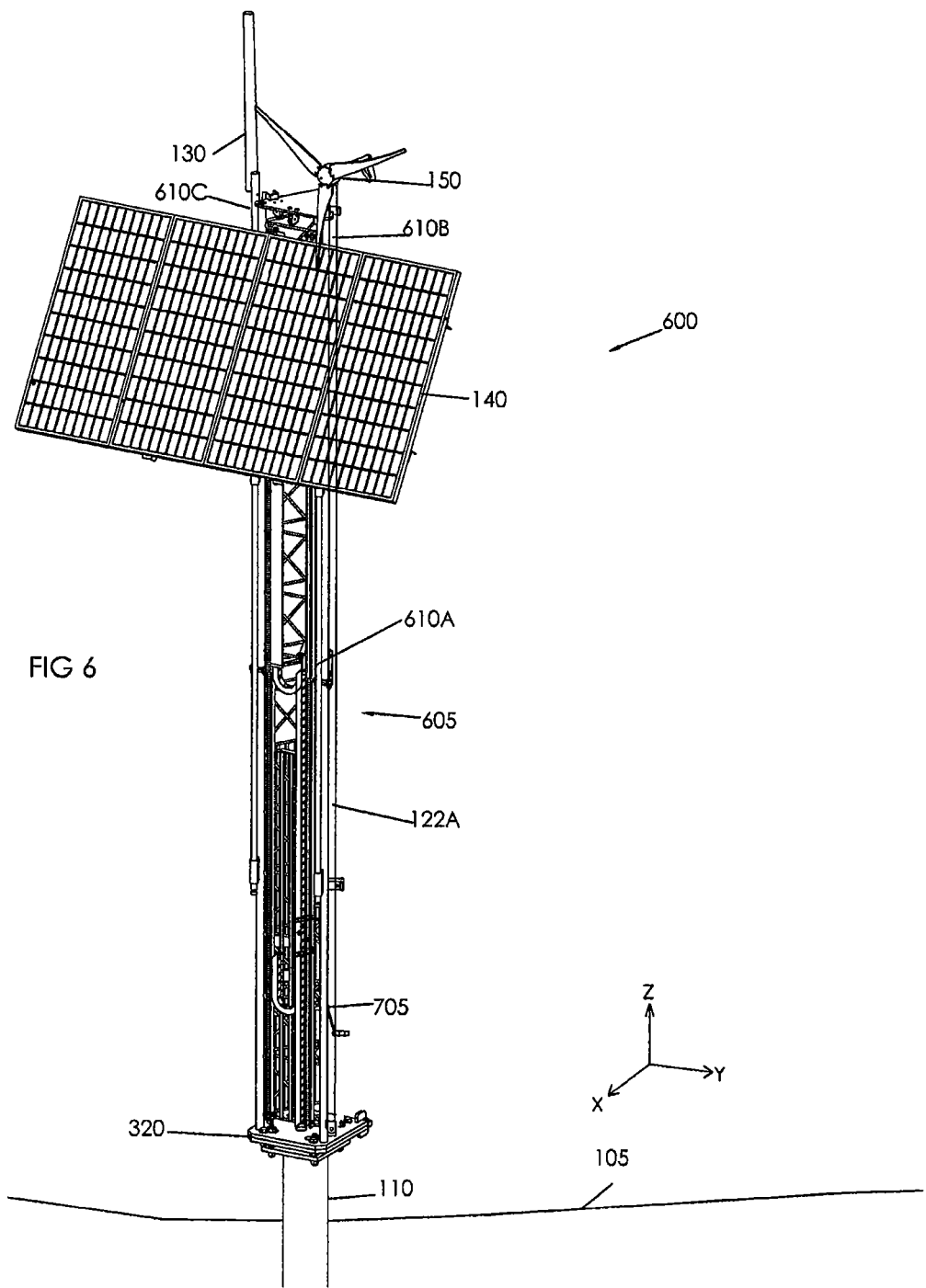
FIG. 6 is an isometric elevation view of another embodiment of a tower structure.

FIG. 6 is an isometric elevation view of another embodiment of a tower structure 600. In this embodiment, the tower structure 600 includes a base 110 that is coupled to the ground 105 having a plurality of articulating mast structures 610A, 610B and 610C supporting a variety of aerial components 125. As the articulating mast structures 610A, 610B and 610C are pivotable relative to the base 110, each of the articulating mast structures 610A, 610B and 610C may comprise a structural section 122A and/or a mast structure 120 as described in FIGS. 1A, 3C-5B. In one aspect, a first articulating mast structure 610A supports a solar module 140 containing one or more solar cells or solar panels, a second articulating mast structure 610B supports a turbine or wind generator 150, and a third articulating mast structure 610C supports an antenna 130. In one embodiment, at least a portion of the first articulating mast structure 610A comprises a mast structure 605 comprising a truss-type structure. Each of the aerial components 125 disposed on the tower structure 600 are capable of being raised or lowered to and from the ground 105 by a winch device 705. In one embodiment, the first articulating mast structure 610A includes a track 615 adapted to facilitate raising or lowering of the solar module 140.

Figure 7E:
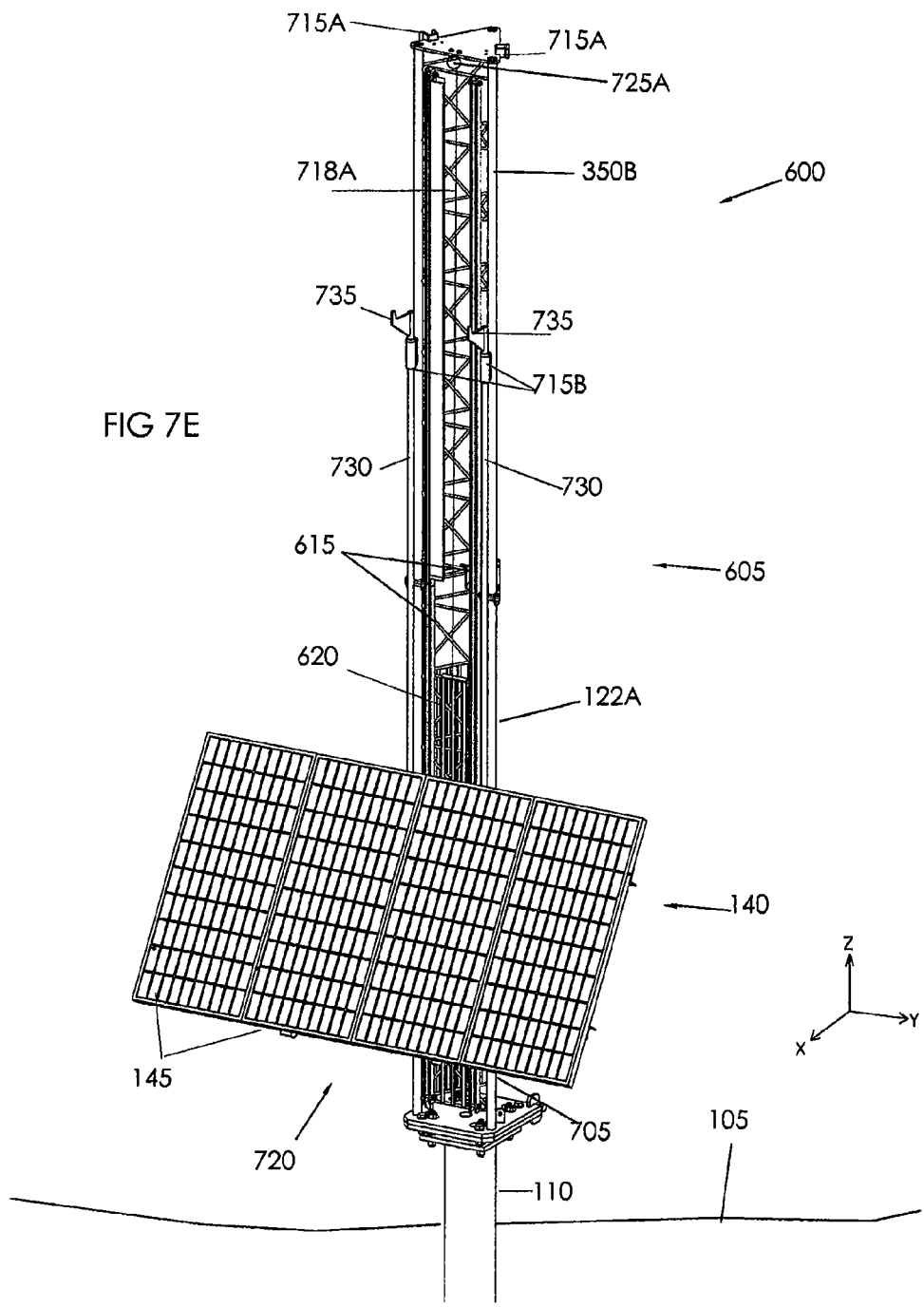
FIG. 7E shows a solar module mounted to the frame structure of FIG. 7D.

FIGS. 7A-7G depict schematic isometric views of one embodiment of an installation sequence for constructing and erecting the tower structure 600 of FIG. 6. FIG. 7A shows a base 110 fixed to the ground 105 and a base plate 305 coupled to the mounting plate 320. The first articulating mast structure 610A may be coupled to the mounting plate 320 by bolts or welding. The base plate 305 and mounting plate 320 are adapted to provide movement of the first articulating mast structure 610A relative to base 110 along a first rotational axis A'. In one embodiment, the first articulating mast structure 610A includes a side or face 620 having the track 615 disposed thereon. The first articulating mast structure 610A may be configured as a first structural section 122A in one embodiment. The base plate 305 may be leveled and positioned as described in FIG. 3A. In one embodiment, one or both of the stationary mounting plate 220 and the base plate 305 are installed and/or adjusted to position the face 620 to face South or a Southern direction.

In one embodiment, the tower structure 600 includes a winch nest 700 having one or more winch devices (not shown) adapted to be coupled to respective mast structures 610B and 610C and/or a frame structure (similar to the frame structure 500 shown in FIGS. 5A and 5B). The winch device that is coupled to the frame structure is adapted to lift or lower the solar panel 140 along the track 615.

FIG. 7B shows the first articulating mast structure 610A having at least two structural sections 122A and 122B. Each of the structural sections 122A and 122B include a first end 350A and a second end 350B. The second end 350B of the structural section 122A is coupled to the first end 350A of structural section 122B by one or more fasteners (not shown). The second end 350B of the structural section 122B may be utilized to attach aerial components 125 or attach additional structural sections. In one embodiment, both of the structural sections 122A, 122B comprise truss structures, each having a weight of 150 pounds or less, such as about 120 pounds, which enables ease of construction. The track 615 may be extended along the structural section 122B. Additionally, each of the structural sections 122A and 122B may comprise support guides 715A, 715B. The support guides 715A are adapted to facilitate support and alignment of other mast structures, such as mast structures 610B or 610C (shown in FIG. 6). The support guides 715B are adapted to facilitate support of a frame structure similar to the frame structure 500 shown in FIGS. 5A and 5B.

FIG. 7C shows the tower structure 600 in a partially erected position. The structural sections 122A and 122B are pushed and/or pulled in or toward the X direction by personnel and/or with the assistance of light machinery such that the mast structure 605 is rotated about the first rotational axis A'. The portion of the installation sequence shown in FIG. 7C may be similar to the installation sequence described in FIG. 3D and will not be repeated for brevity.

FIG. 7D shows the tower structure 600 in an upright position. Fasteners, such as bolts may be utilized to couple the mounting plate 320 to the base plate 305 to secure mast structure 605 to base 110. Additionally, a frame structure 720 similar to the frame structure 500 shown in FIGS. 5A and 5B (without the rotatable base plates 525A, 525B) may be coupled to the track 615. The frame structure 720 is utilized to mount one or more solar panels to the tower structure 600. The frame structure 720 in this embodiment comprises a wheel assembly that couples with the track 615. For example, one or more wheels (not shown) may be coupled to the backside of the frame structure 720 in a position to engage the tracks 615.

FIG. 7E shows the solar module 140 mounted to the frame structure 720. A first cable 718A is coupled to a first winch device disposed in the winch nest 700 (not shown in this view). The first cable 718A is routed through a first pulley device 725A coupled to the second end 350B of the mast structure 605. The first cable 718A pulls the frame structure 720 towards the first pulley device 725A along the track 615. Additionally, one or more rotatable rods 730 are disposed in the support guides 715B. The rotatable rods 730 may be utilized to support the frame structure 720 when the frame structure 720 is at a suitable position along the tower structure 600. The rotatable rods 730 include support members 735 at a distal end thereof. The rotatable rods 730 are movable within the support guides 715B to allow the support members 735 to be selectively positioned.

FIG. 7F shows the solar module 140 and frame structure 500 being lifted vertically (Z direction) by a winch device 710A within the winch nest 700 along the track 615. Cable trays 722 may be disposed on the face 620 of the structural sections 122A and 122B to protect signal cables (not shown).

Figure 7G:
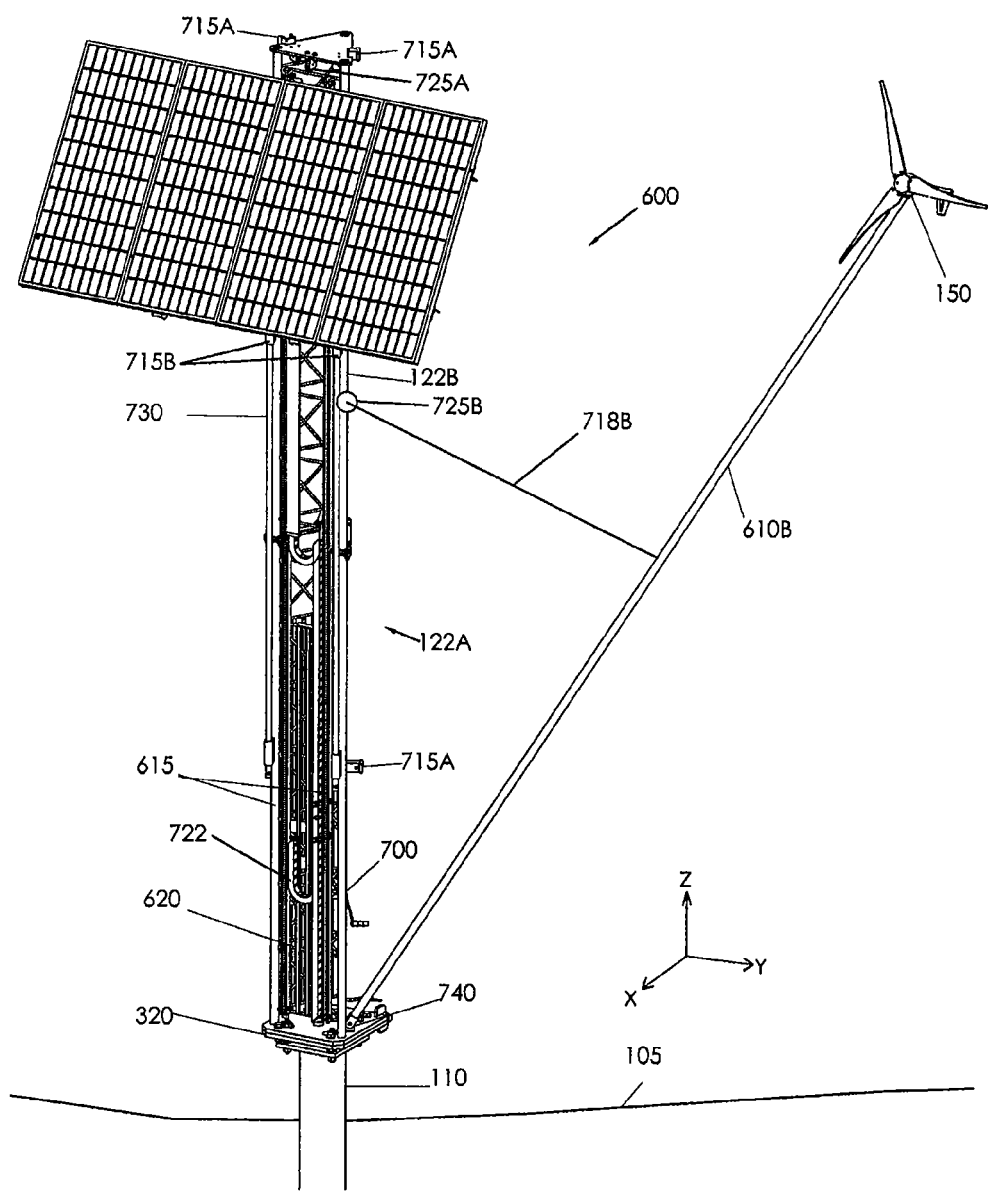
FIG. 7G shows the first articulating mast structure of FIG. 6 in a fully erected position and a portion of one embodiment of an installation sequence for a second articulated mast structure.

FIG. 7G shows the solar module 140 and the frame structure 720 in a fully erected position. The solar module 140 and/or the frame structure 720 are secured utilizing tension of the first cable 718A and/or a safety system (not shown). In one embodiment, a second articulated mast structure 610B is coupled to mounting plate 320 and/or structural section 122A by a hinge device 740. A second cable 718B is coupled to a second winch device (not shown in this view) within the winch nest 700. The second cable 715B is routed through a second pulley device 725B coupled to the structural section 122B. The second winch device is actuated to tension the second cable 725B and raise the second articulated mast structure 610B. In this configuration, the second articulated mast structure 610B may be pivoted relative to mounting plate 320 and raised to a vertical orientation that in one embodiment is substantially parallel relative to the first articulating mast structure 610A. The second articulated mast structure 610B may be coupled to the support guides 715A disposed on the structural sections 122A, 122B and secured.

It is noted that the third articulated mast structure 610C (shown in FIG. 6) may be mounted to the mounting plate 320 and/or structural section 122A by a hinge device (not shown) similar to the hinge device 740. A third winch (not shown) within the winch nest 700 may be coupled to a third cable by a third pulley device (both not shown) to facilitate lifting of the third articulated mast structure 610C. The installation of the third articulated mast structure 610C is similar to that of the installation of the second articulated mast structure 610B and will not be described for brevity. It is also noted that any one or all of the mast structures 610A-610C may be lowered by reversing the operation described above to facilitate maintenance or replacement of the respective aerial components 125 coupled to the tower structure 600.

Figure 8B:
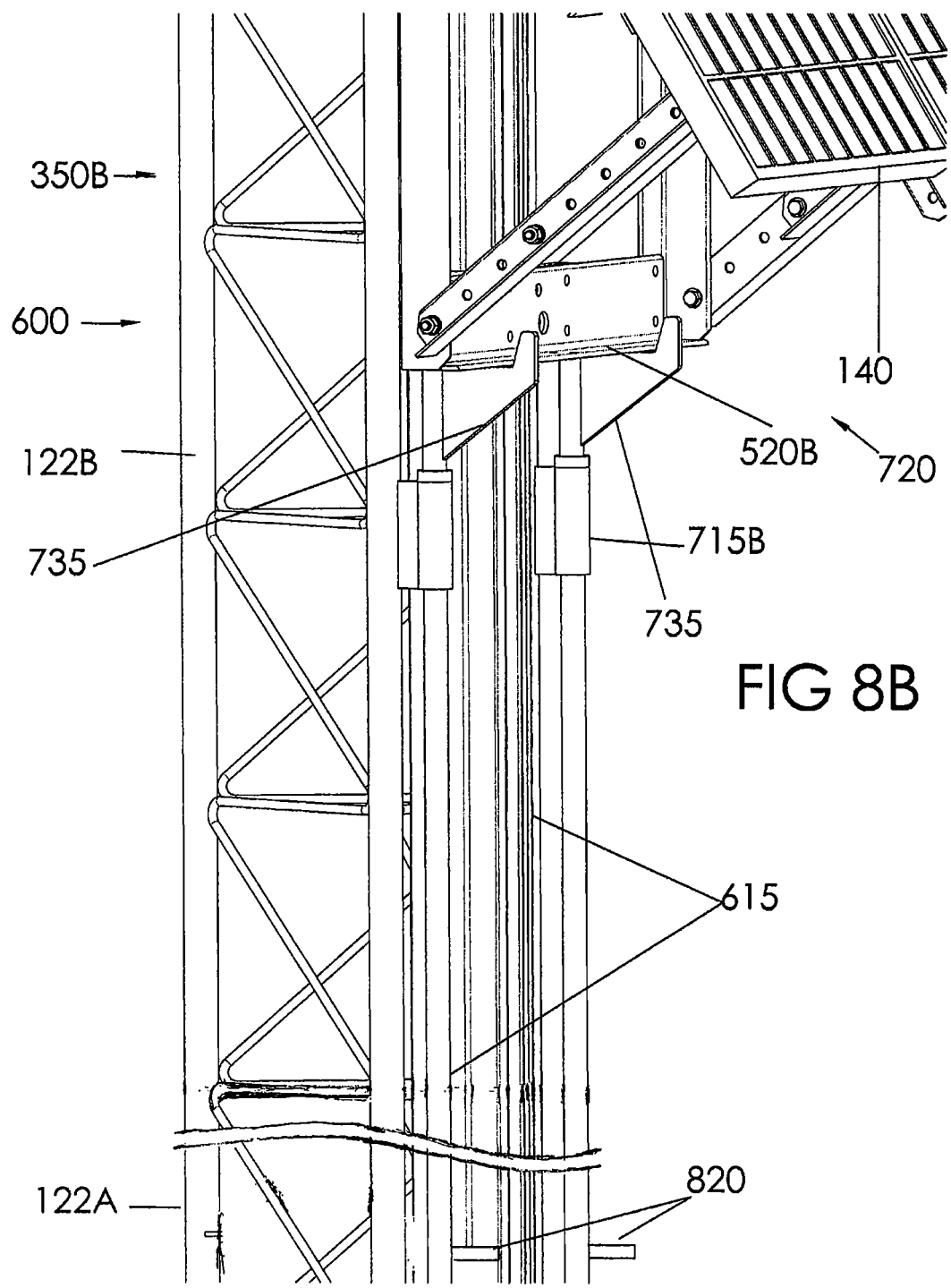

FIGS. 8A and 8B show one embodiment of a safety system 800 that may be utilized on the tower structure 600 of FIG. 6. In this embodiment, the first articulating mast structure 610A is fully erected and is in a substantially vertical orientation (Z direction). The safety system 800 is adapted to provide long-term support for the frame structure 720 and solar module 140. The safety system 800 may be utilized alone or in combination with tension from the winch device 710A to support the frame structure 720 and solar module 140.

The safety system 800 includes one or more support members 735 coupled to a respective rotatable rods 730. The rotatable rods 730 are supported and contained within support guides 715B. The rotatable rods 730 are adapted to rotate within the support guides 715B in a rotational axis 805. The rotatable rods 730 are movable to move the support members 735 clear of the frame structure 720 as the frame structure 720 is moving along the track 615. The rotatable rods 730 may be rotated to support the frame structure 720 when desired. A handle 820 may be coupled to the rotatable rods 730 to facilitate rotation of the rotatable rods 730 in axis 805. The handles 820 are disposed on the structural section 122A of the tower structure 600 allowing access by personnel on the ground (not shown in this view).

In operation, the frame structure 720 and solar module 140 are moved vertically upward (Z direction). The rotatable rods 730 are rotated to rotate the support members 735 away from track 615 and/or the frame structure 720. When the support members 735 are rotated to this position, the structural members 520A and 520B the frame structure 720 (only structural member 520B is shown) may clear the support members 735. After the structural member 520B is past the support members 735, the rotatable rods 730 are rotated to a position where the support members 735 are in the path of the structural member 520B as shown in FIG. 8A. When the support members 735 are in this position, the frame structure 720 may be lowered to allow the structural member 520B to rest on the support members 735 as shown in FIG. 8B.

The tower structures 100 and 600 as described herein may include a fully erected height of between 10 feet to about 100 feet above the ground 105 or the base 110. The tower structures 100 and 600 as described herein are modular units having discrete elements that may be easily transported and are configured to be erected on site without the use of crane or heavy equipment. The tower structures 100 and 600 may be constructed and erected using minimal light-duty equipment and/or personnel. The elimination of cranes and minimization of heavy equipment saves costs of construction. Further, each of the tower structures 100 and 600 as described herein may be partially deconstructed without the use of a crane or heavy machinery. This is particularly advantageous for maintenance of the tower structure and/or servicing or replacement of aerial components.

While the foregoing is directed to embodiments of the invention, other and further embodiments of the invention may be devised without departing from the basic scope thereof, and the scope thereof is determined by the claims that follow.

The invention claimed is:

1. A tower structure, comprising:
   a base plate adapted to be coupled to a stationary base plate;
   a flange hingedly coupled to the base plate, the base plate and the flange being movable relative to each other in a first rotational axis;
   an intermediate structure coupled to the flange; and
   a mast structure coupled to the intermediate structure at a fulcrum providing movement of the mast structure in a second rotational axis relative to the intermediate structure, wherein:
   the base plate has a first plurality of through-holes and a second plurality of through-holes, wherein each of the second plurality of through-holes are disposed in a position between each of the through-holes of the first plurality of through-holes, and
   the flange has a third plurality of through-holes that substantially align with the second plurality of through-holes in the base plate and a fourth plurality of through-holes each having a dimension greater than a dimension of each of the third plurality of through-holes and disposed in a position to substantially align with the first plurality of through-holes in the base plate.

2. The tower structure of claim 1, further comprising:
   an aerial component coupled to the mast structure.

3. The tower structure of claim 1, wherein the intermediate structure comprises a first side and a second side, the first side comprising a channel.

4. The tower structure of claim 3, wherein at least a portion of the mast structure is received in the channel when the intermediate structure and the mast structure are substantially parallel.

5. The tower structure of claim 3, wherein the intermediate structure comprises a winch device disposed on the second side of the intermediate structure.

6. The tower structure of claim 1, wherein the intermediate structure includes a first opening for receiving a lug disposed on the mast structure when the intermediate structure and the mast structure are substantially parallel.

7. The tower structure of claim 6, wherein the intermediate structure includes a second opening for receiving a cable from a winch device disposed on the intermediate structure.

8. A tower structure, comprising:
   a first hinged base plate adapted to be coupled to a stationary base plate;
   a second hinged base plate coupled to the first hinged base plate, the first hinged base plate and the second hinged base plate being movable relative to each other in a first rotational axis;
   a first structural section coupled to the second hinged base plate, the first structural section comprising a first side and a second side;
   a second structural section coupled to the first structural section at a fulcrum providing movement of the second structural section in a second rotational axis relative to the first structural section; and
   an aerial component coupled to the second structural section, wherein:
   at least a portion of the second structural section is received in a channel in an exterior of the first side of the first structural section when the first structural section and the second structural section are substantially parallel;
   the first hinged base plate has a first plurality of through-holes, and a second plurality of through-holes, wherein each of the second plurality of through-holes are disposed in a position between each of the through-holes of the first plurality of through-holes, and
   the second hinged base plate has a third plurality of through-holes and a fourth plurality of through-holes each having a dimension greater than a dimension of each of the third plurality of through-holes, the third plurality of through-holes substantially aligning with the second plurality of through-holes in the first hinged base plate and the fourth plurality of through-holes substantially aligning with the first plurality of through-holes in the first hinged base plate.

9. The tower structure of claim 8, wherein the first structural section comprises a winch device disposed on the second side of the first structural section.

10. The tower structure of claim 8, wherein the first structural section includes a first opening for receiving a lug disposed on the second structural section when the first structural section and the second structural section are substantially parallel.

11. The tower structure of claim 10, wherein the first structural section includes a second opening for receiving a cable from a winch device disposed on the first structural section.

* * * * *

UNITED STATES PATENT AND TRADEMARK OFFICE
CERTIFICATE OF CORRECTION

| | | |
|---|---|---|
| PATENT NO. | : 8,910,432 B2 | |
| APPLICATION NO. | : 13/083026 | |
| DATED | : December 16, 2014 | |
| INVENTOR(S) | : Egan et al. | |

It is certified that error appears in the above-identified patent and that said Letters Patent is hereby corrected as shown below:

In the Specification

In Detailed Description:

Column 4, Line 28, please delete "10" and insert --1C-- therefor.

Signed and Sealed this
Ninth Day of June, 2015

Michelle K. Lee
*Director of the United States Patent and Trademark Office*